US012572452B2

(12) United States Patent
Hamid

(10) Patent No.: US 12,572,452 B2
(45) Date of Patent: *Mar. 10, 2026

(54) SYSTEM AND METHOD FOR AUTOMATED SOFTWARE TESTING

(71) Applicant: SMARTLYTICS LLC, Bellevue, WA (US)

(72) Inventor: Syed Hamid, Redmond, WA (US)

( * ) Notice: Subject to any disclaimer, the term of this patent is extended or adjusted under 35 U.S.C. 154(b) by 216 days.

This patent is subject to a terminal disclaimer.

(21) Appl. No.: 18/483,498

(22) Filed: Oct. 9, 2023

(65) Prior Publication Data

US 2024/0037020 A1 Feb. 1, 2024

Related U.S. Application Data

(63) Continuation-in-part of application No. 17/498,644, filed on Oct. 11, 2021, now Pat. No. 11,934,301, and a continuation of application No. 17/387,963, filed on Jul. 28, 2021, now abandoned, said application No. 17/498,644 is a continuation-in-part of application No. 17/387,963, filed on Jul. 28, 2021, now abandoned, which is a continuation-in-part of
(Continued)

(51) Int. Cl.
| | |
|---|---|
| *G06F 11/3668* | (2025.01) |
| *G06F 11/3698* | (2025.01) |
| *G06N 5/04* | (2023.01) |
| *G06N 20/00* | (2019.01) |

(52) U.S. Cl.
CPC ...... *G06F 11/3688* (2013.01); *G06F 11/3684* (2013.01); *G06F 11/3698* (2025.01); *G06N 5/04* (2013.01); *G06N 20/00* (2019.01)

(58) Field of Classification Search
CPC ............. G06F 11/3684; G06F 11/3688; G06F 11/3698; G06N 5/04; G06N 20/00
USPC .................................................. 717/124–133
See application file for complete search history.

(56) References Cited

U.S. PATENT DOCUMENTS 8,978,014 B1    3/2015  Larsen et al.
9,430,364 B1    8/2016  Ryan et al.
(Continued)

OTHER PUBLICATIONS

Mulikita, "Mobile Application Testing", 2012, University of Applied Sciences Cologne, Germany, 25 pages | (Year: 2012).*
(Continued)

*Primary Examiner* — Ted T. Vo
(74) *Attorney, Agent, or Firm* — Boon Intellectual Property Law, PLLC; Brian S. Boon

(57) ABSTRACT

A system and method for automated software testing that uses machine learning algorithms to automatically generate and implement software testing based on an automated analysis of the software. In an embodiment, a mobile software application comprising one or more screens is processed through a trained machine learning algorithm to identify screens and objects, understand the operational flow of the application, define priorities and dependencies within the application, define validation tests, and automatically generate one or more testing scenarios for the application. The testing scenarios may then be fed to an automated execution module which installs the application on one or more physical or virtual devices and performs testing on the application installed on those devices according to the testing scenario.

12 Claims, 21 Drawing Sheets

Related U.S. Application Data application No. 16/590,293, filed on Oct. 1, 2019, now abandoned, which is a continuation-in-part of application No. 15/869,013, filed on Jan. 11, 2018, now Pat. No. 10,430,324.

(60) Provisional application No. 63/057,480, filed on Jul. 28, 2020, provisional application No. 62/445,200, filed on Jan. 11, 2017.

(56) References Cited

U.S. PATENT DOCUMENTS

| | | | |
|---|---|---|---|
| 9,858,174 B2 | 1/2018 | Straub et al. | |
| 9,990,110 B1 | 6/2018 | Lounibos et al. | |
| 11,934,301 B2 * | 3/2024 | Hamid | G06F 11/323 |

OTHER PUBLICATIONS

Alsing, "Mobile Object Detection using TensorFlow Lite and Transfer Learning", 2018, KTH Royal Institute of Technology, Sweden, pp. i-viii, 1-67 (Year: 2018).*

Sailthru, "3 Types of Machine Learning: Supervised, Unsupervised and Reinforcement Learning", 2020, retrieved from https://www.sailthru.com/marketing-blog/ , 3 pages. (Year: 2020).*

Gomez et al., "Mining Test Respositories for Automatic Detection of UI Performance Regressions in Andriod Apps", 2016, Working Conference on Mining Software Repositories, pp. 13-24 (Year: 2016) found at https://dl.acm.org/citation.cfm?id=2901747.

Graham Odds, "Contextual cues in user interface design", 2010, retrieved from https://blog.scottlogic.com/2010/05/19/contextual-cues-in-ui-design.html, 5 pages (Year: 2010).

* cited by examiner

200

400
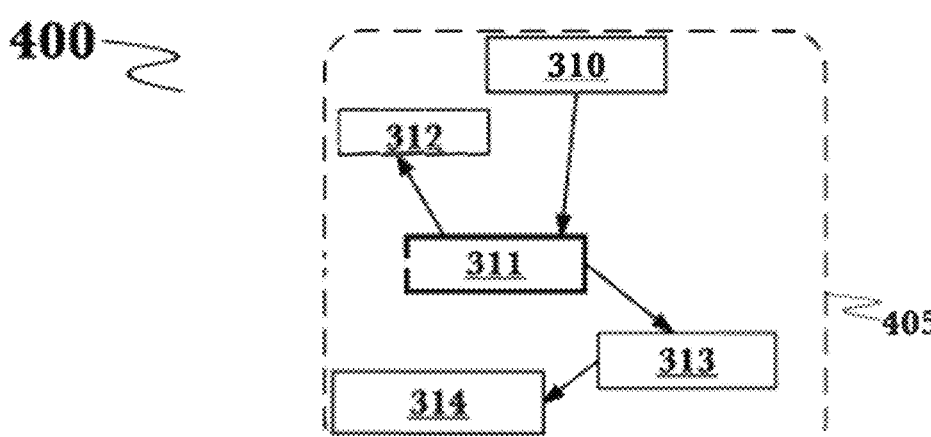
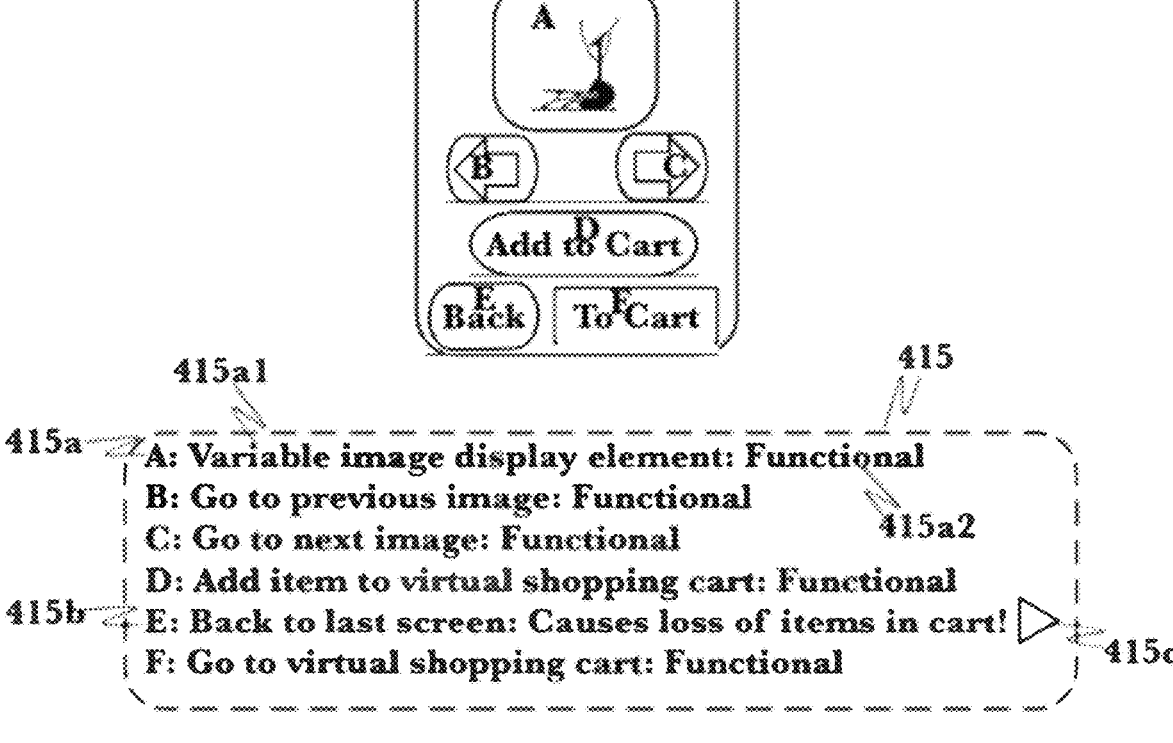
415a1
415
415a  A: Variable image display element: Functional
B: Go to previous image: Functional          415a2
C: Go to next image: Functional
D: Add item to virtual shopping cart: Functional
415b  E: Back to last screen: Causes loss of items in cart!        415c
F: Go to virtual shopping cart: Functional
Fig. 4

702

701

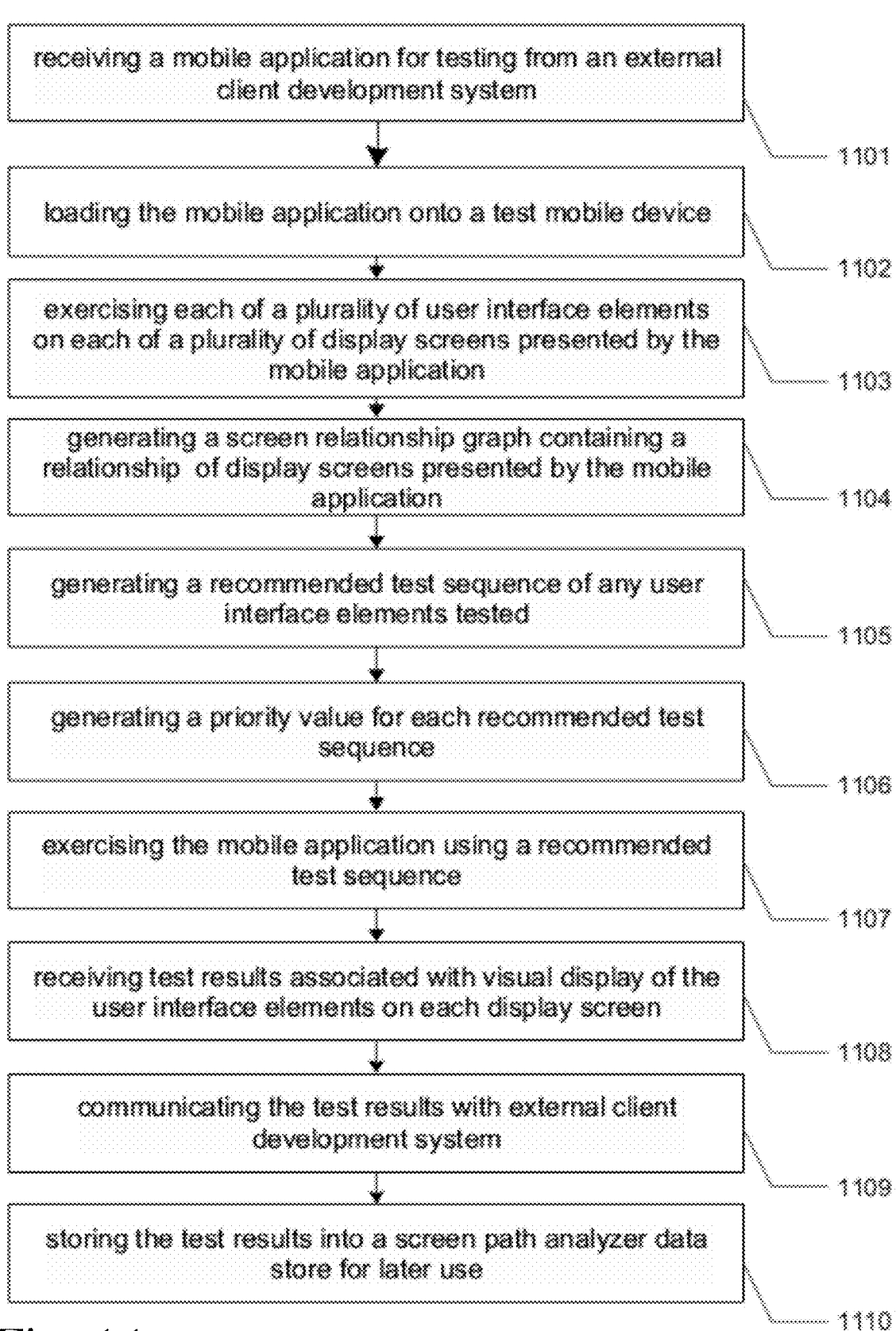

receiving a mobile application for testing from an external client development system — 1101 loading the mobile application onto a test mobile device — 1102 exercising each of a plurality of user interface elements on each of a plurality of display screens presented by the mobile application — 1103 generating a screen relationship graph containing a relationship of display screens presented by the mobile application — 1104 generating a recommended test sequence of any user interface elements tested — 1105 generating a priority value for each recommended test sequence — 1106 exercising the mobile application using a recommended test sequence — 1107 receiving test results associated with visual display of the user interface elements on each display screen — 1108 communicating the test results with external client development system — 1109 storing the test results into a screen path analyzer data store for later use — 1110

Fig. 11

SYSTEM AND METHOD FOR AUTOMATED SOFTWARE TESTING

CROSS-REFERENCE TO RELATED APPLICATIONS

Priority is claimed in the application data sheet to the following patents or patent applications, the entire written description, including figures, of each of which is expressly incorporated herein by reference in its entirety:
Ser. No. 17/498,644
Ser. No. 17/387,963
63/057,480
Ser. No. 16/590,293
Ser. No. 15/869,013
62/445,200
Ser. No. 16/719,635

BACKGROUND

Field of the Art

The present invention is in the field of computer systems for automated software testing.

Discussion of the State of the Art

Application testing has been a required task of software development since the advent of the computer. As might be expected, the task began as a fully manual endeavor with the process greatly exacerbated by the need to introduce all patches into the code using manual punch cards or tapes and the paucity of computer time available to run those patched programs once submitted. The arrival of interactive modes of interaction with the computer greatly streamlined application development including the testing and patching of applications in development. However, an application found to function correctly in-house at the developing corporation often is shipped containing defects or "bugs," some serious including abnormal ending of the application or crashing of the entire computer system, that do not emerge until all aspects and use combinations of the application's features are tested, a task that is resource prohibitive if done manually. Even the use of external "alpha" and "beta" testers may take a prohibitively long period of time and has not been shown to uncover even serious bugs with sufficient regularity. Recently, programs have been written with the sole purpose of exhaustively exercising other programs, the applications in development. These testing system programs function continuously and extremely rapidly, finally allowing such exhaustive exercise of all application features in all plausible combinations and have greatly advanced the area of application testing. Unfortunately, to date the vast majority of the test system programs are very rigid in what they do and are written to test a single or extremely small subset of applications under development.

Nothing has increased the demand for new application development more than the recent significant popularity of mobile devices including, but not limited to smart phones and tablets. This increased demand leaves current methods of prerelease application testing sorely inadequate, including the method of writing advanced, but rigid, single application test program systems.

What is needed is a system and method for automated software testing that uses machine learning algorithms to automatically generate and implement software testing based on an automated analysis of the software.

automatically generate and implement software testing based on an automated analysis of the software.

SUMMARY

Accordingly, the inventor has developed a system and method for automated software testing that uses machine learning algorithms to automatically generate and implement software testing based on an automated analysis of the software. In an embodiment, a mobile software application comprising one or more screens is processed through a trained machine learning algorithm to identify screens and objects, understand the operational flow of the application, define priorities and dependencies within the application, define validation tests, and automatically generate one or more testing scenarios for the application. The testing scenarios may then be fed to an automated execution module which installs the application on one or more physical or virtual devices and performs testing on the application installed on those devices according to the testing scenario.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 4 is an illustration of an analysis summary screen for a page of a hypothetical mobile application produced as part of the function of the intelligent mobile application testing system according to one aspect.

Figure 7B:
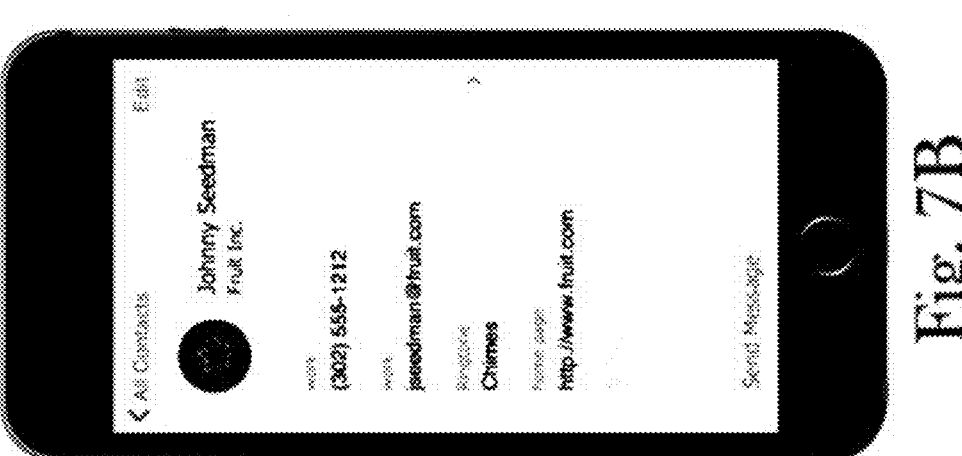
Figure 7A:
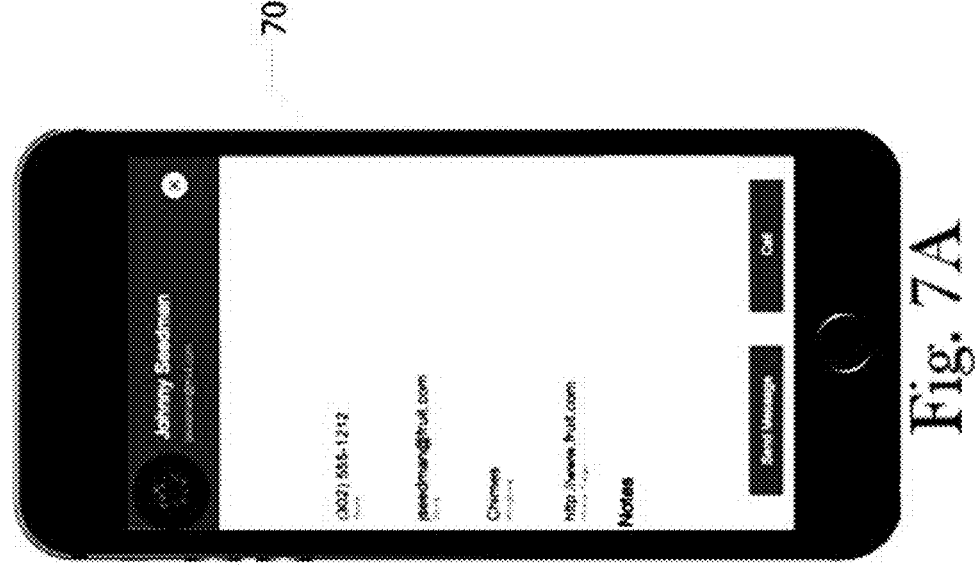

FIGS. 7A-B is an example mobile application screens produced within testing mobile devices as part of the function of the intelligent mobile application testing system according to one aspect.

Figure 8:
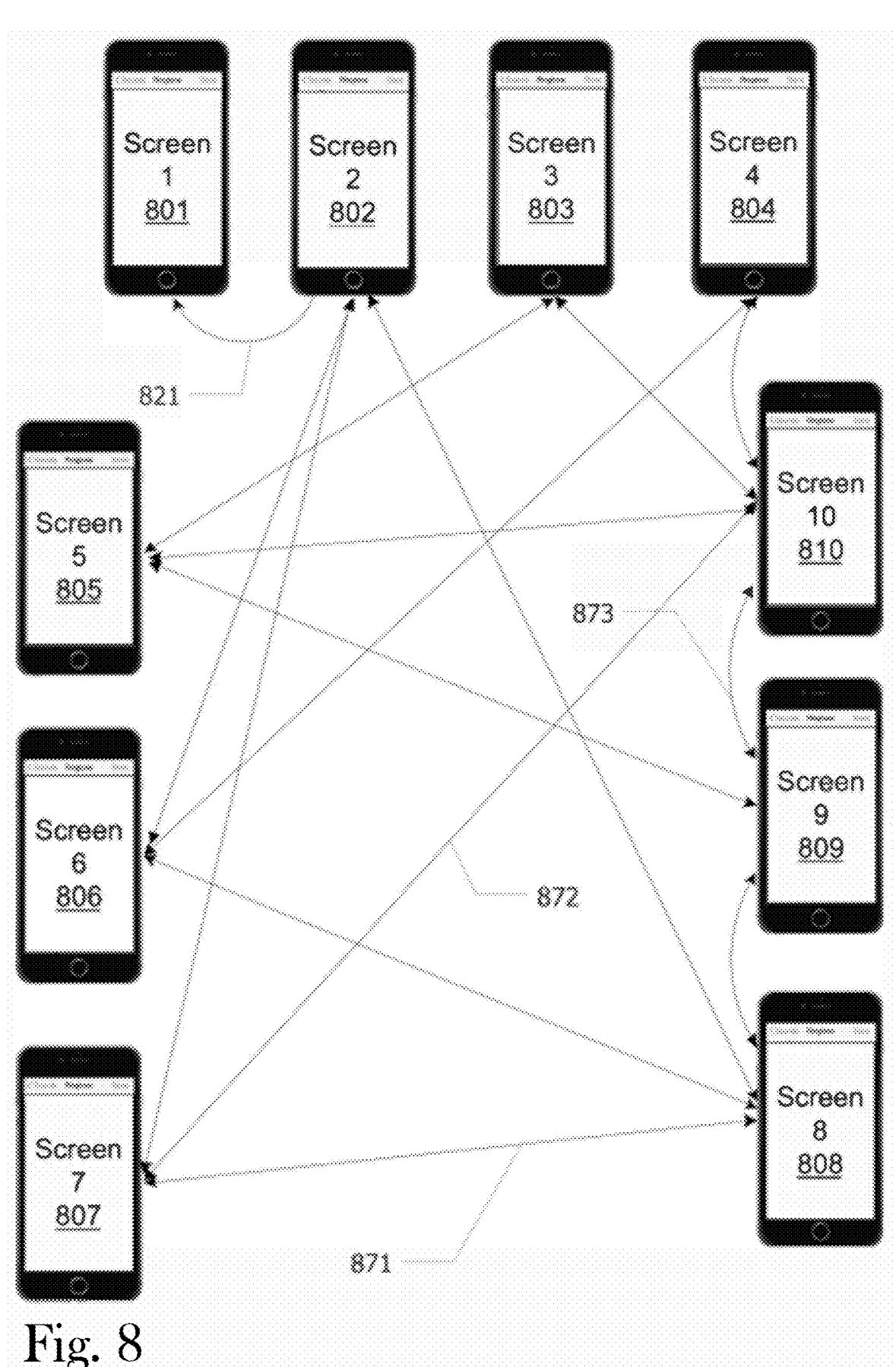

FIG. 8 is an example screen relationship graph for a mobile application produced as part of the function of the intelligent mobile application testing system according to one aspect.

Figure 9A:
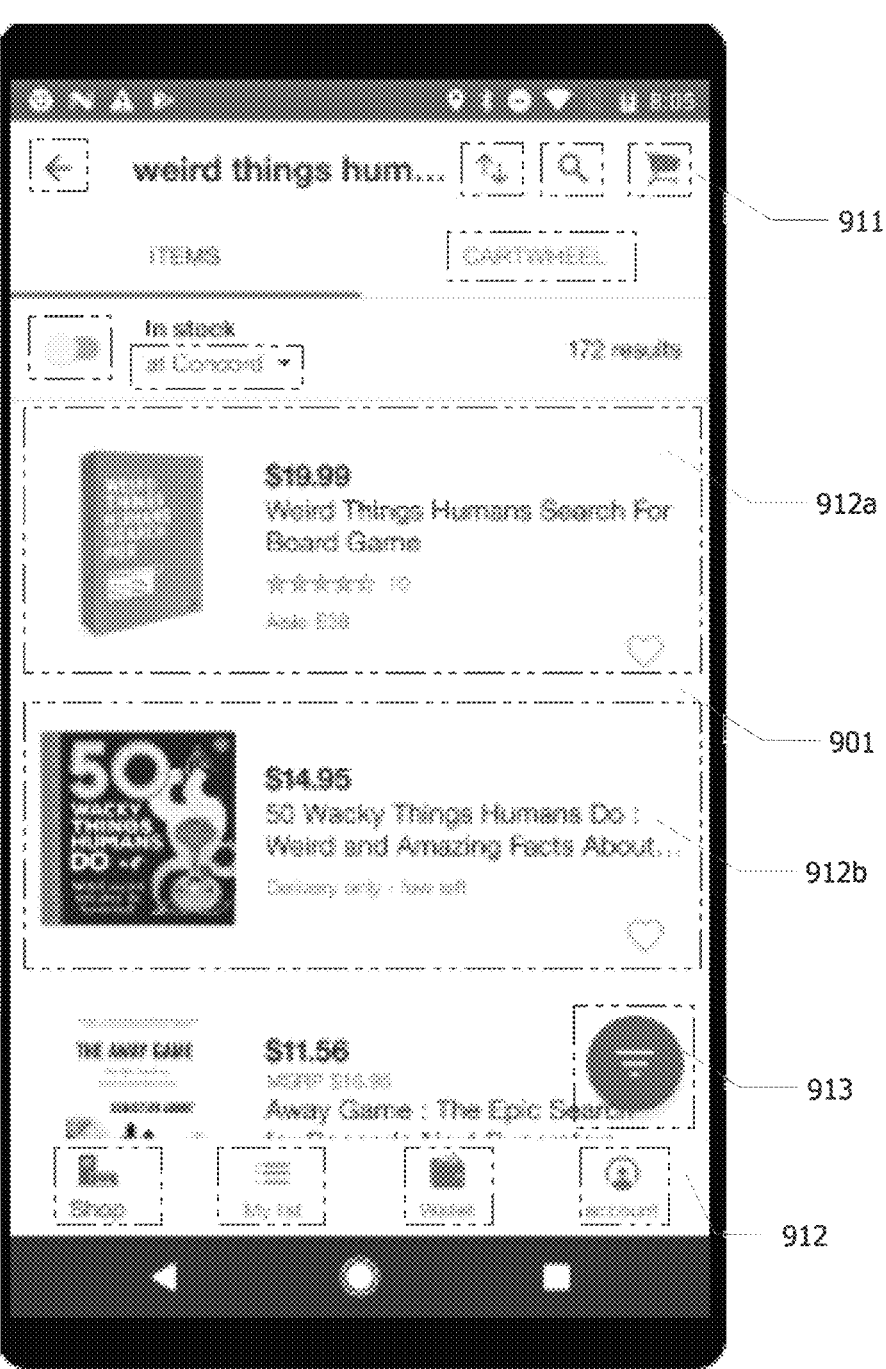
Figure 9B:
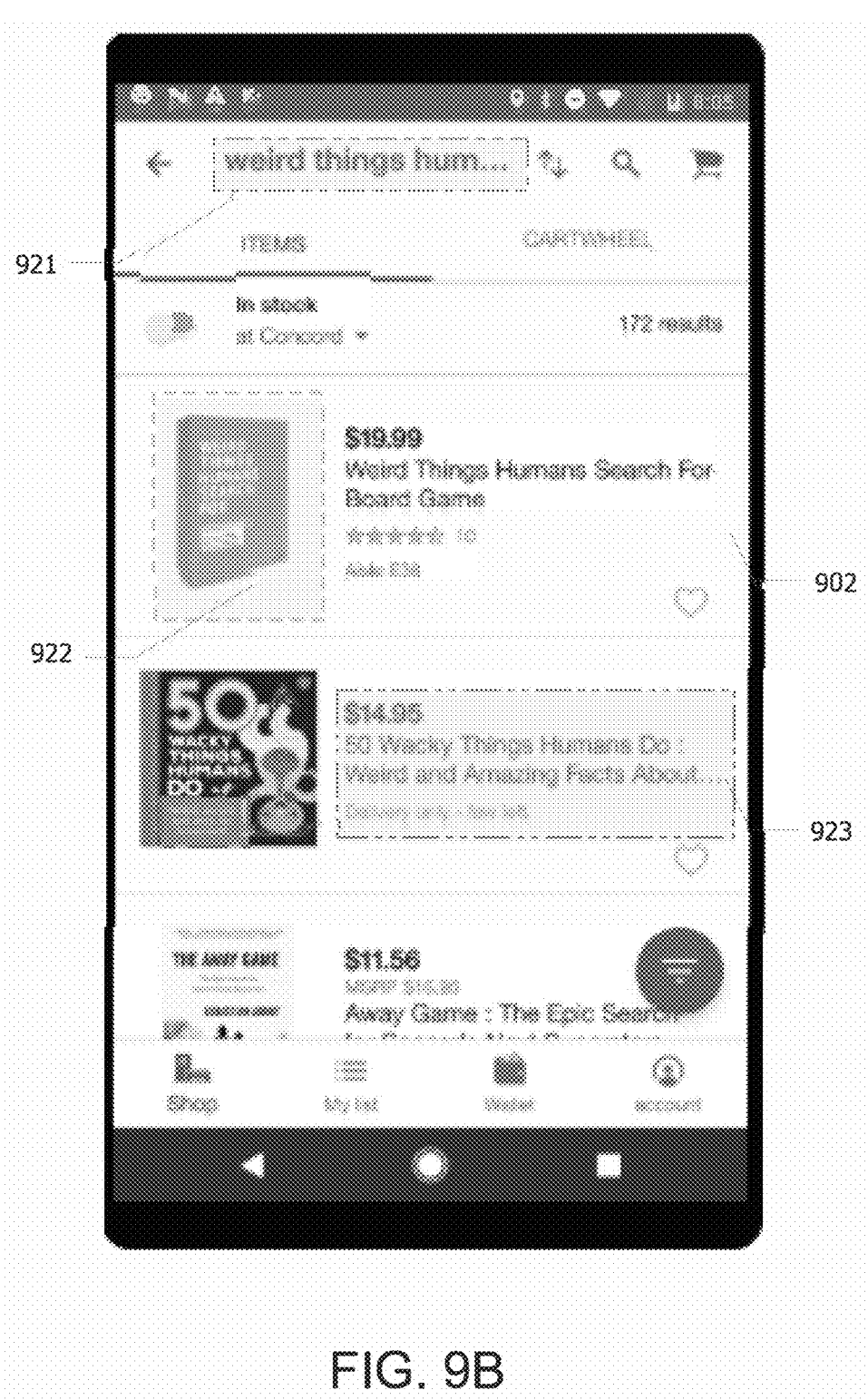

FIGS. 9A-B are an example mobile application usability screens produced as part of the function of the intelligent mobile application testing system according to one aspect.

Figure 10:
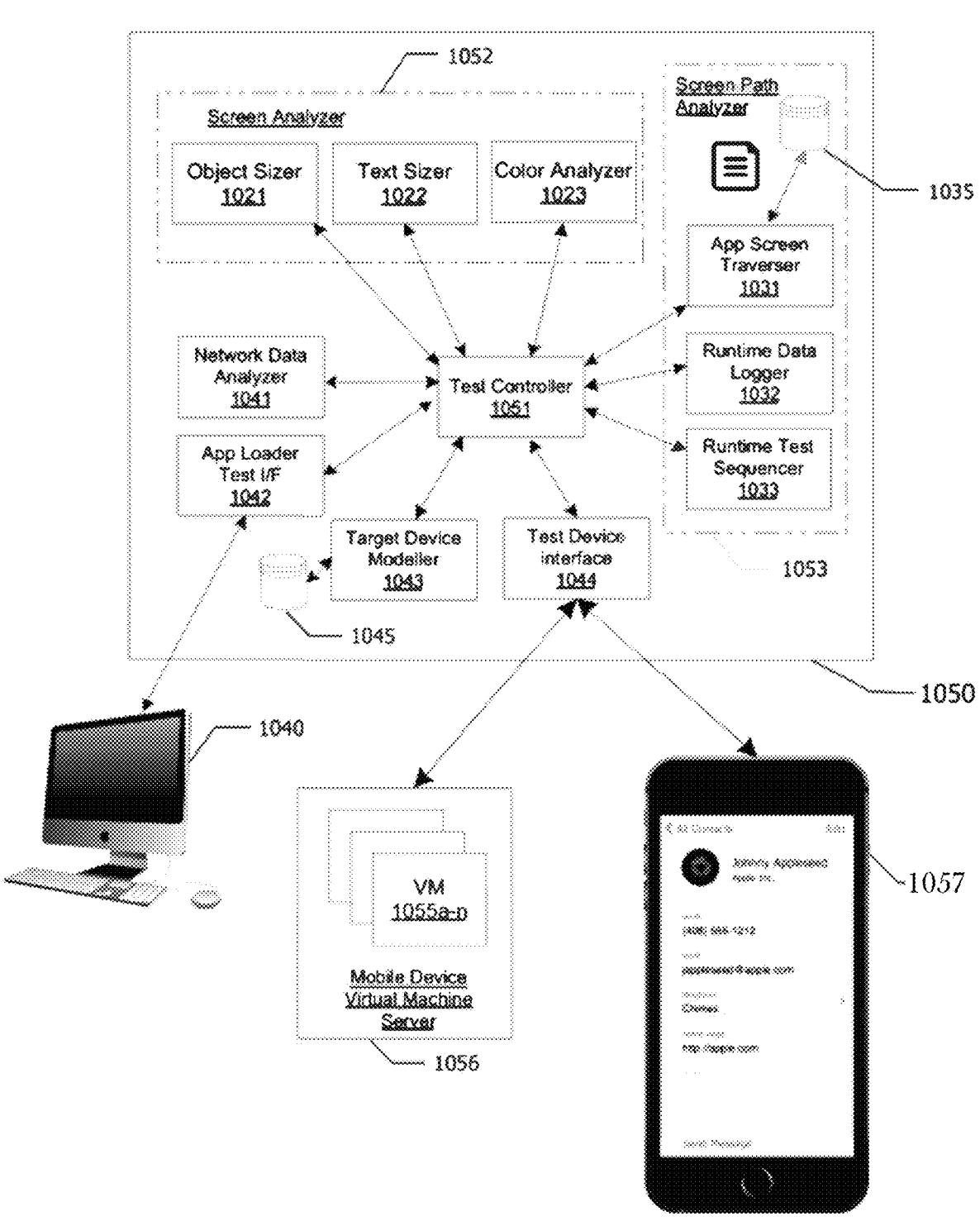

FIG. 10 is an example processing architecture for and exemplary embodiment the intelligent mobile application testing system according to one aspect.

FIG. 11 is an example flowchart of operations implementing an exemplary mobile device testing according to one aspect.

Figure 12:
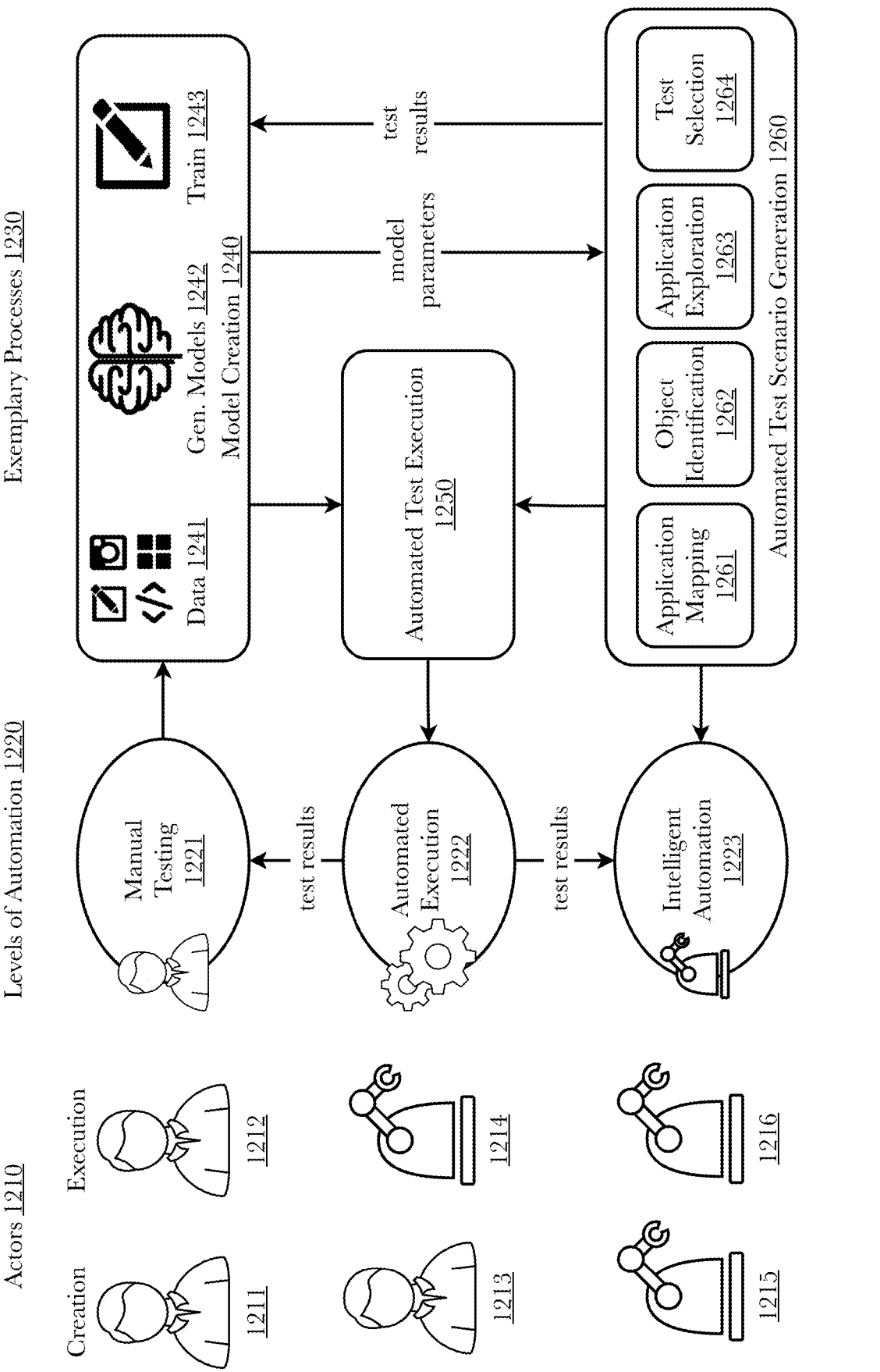

FIG. 12 is a diagram showing exemplary relationships between actors, levels of automation, and processes for automated generation and implementing of software testing based on an automated analysis of the software.

Figure 13:
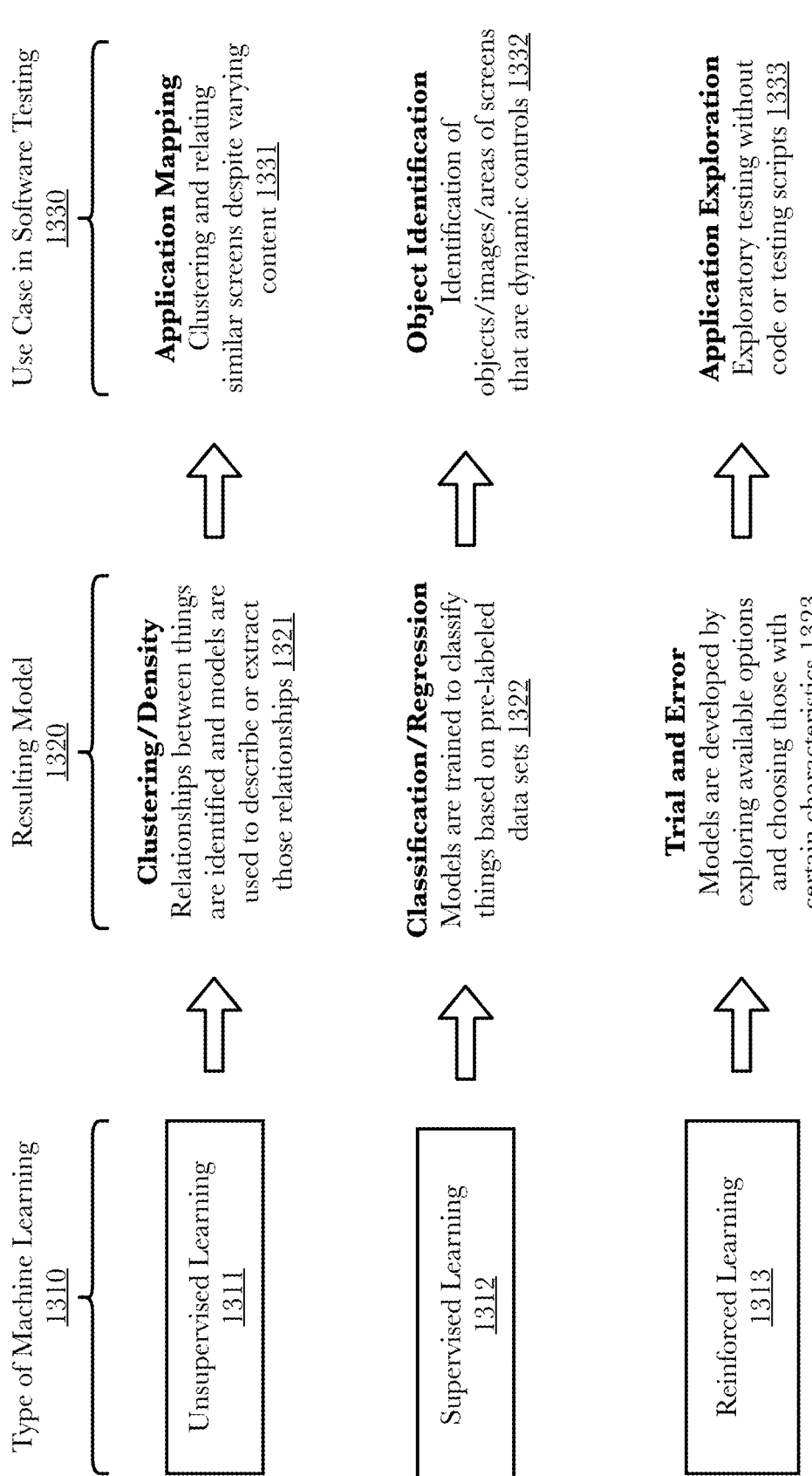

FIG. 13 is a diagram showing the relationships between different types of machine learning algorithms, the models that can be developed from them, and the use cases to which they may be applied in software testing.

Figure 14:
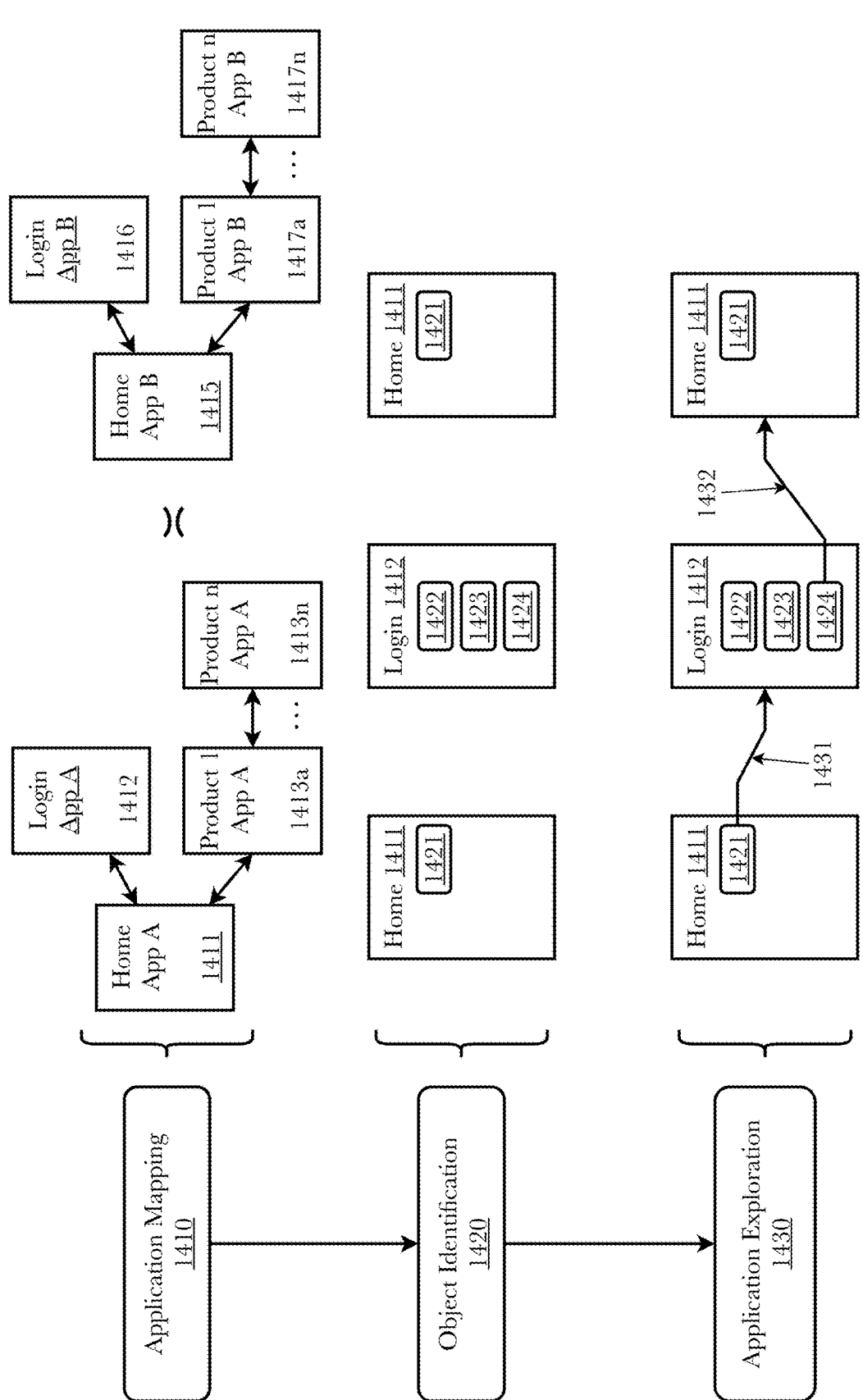

FIG. 14 is a diagram showing the use of machine learning algorithms to analyze a software application for generation of testing scenarios.

Figure 15:
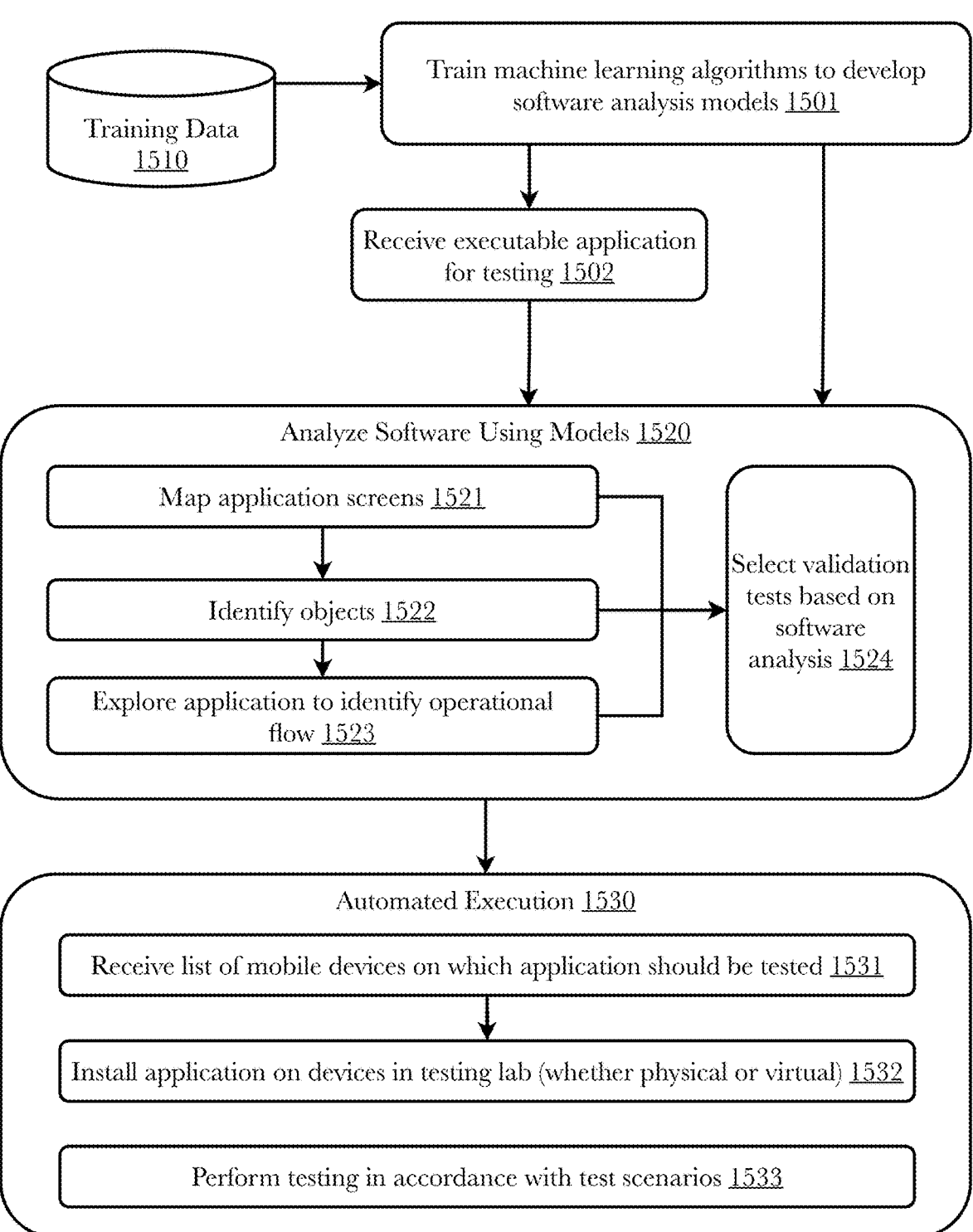

FIG. 15 is a diagram showing the overall process for using machine learning algorithms to automatically develop and implement testing scenarios based on an automated analysis of software.

Figure 16:
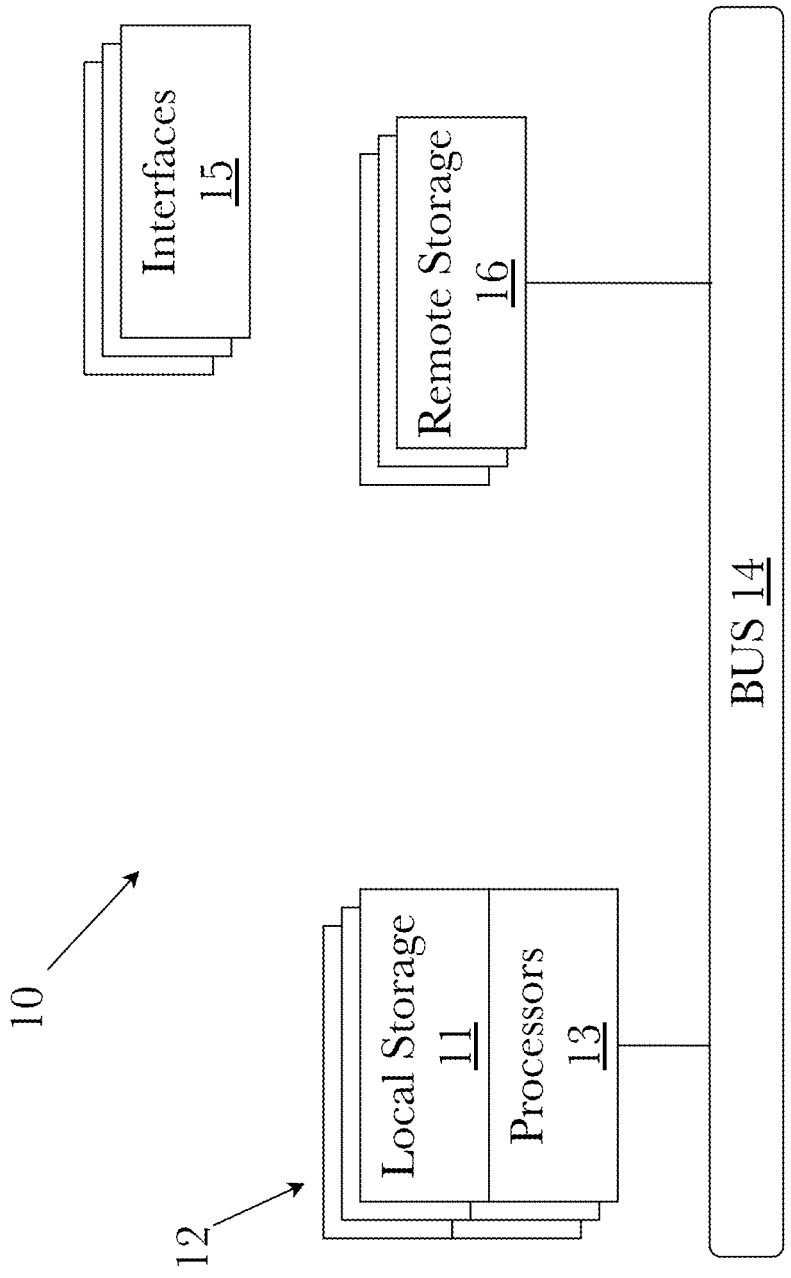

FIG. 16 is a block diagram illustrating an exemplary hardware architecture of a computing device.

Figure 17:
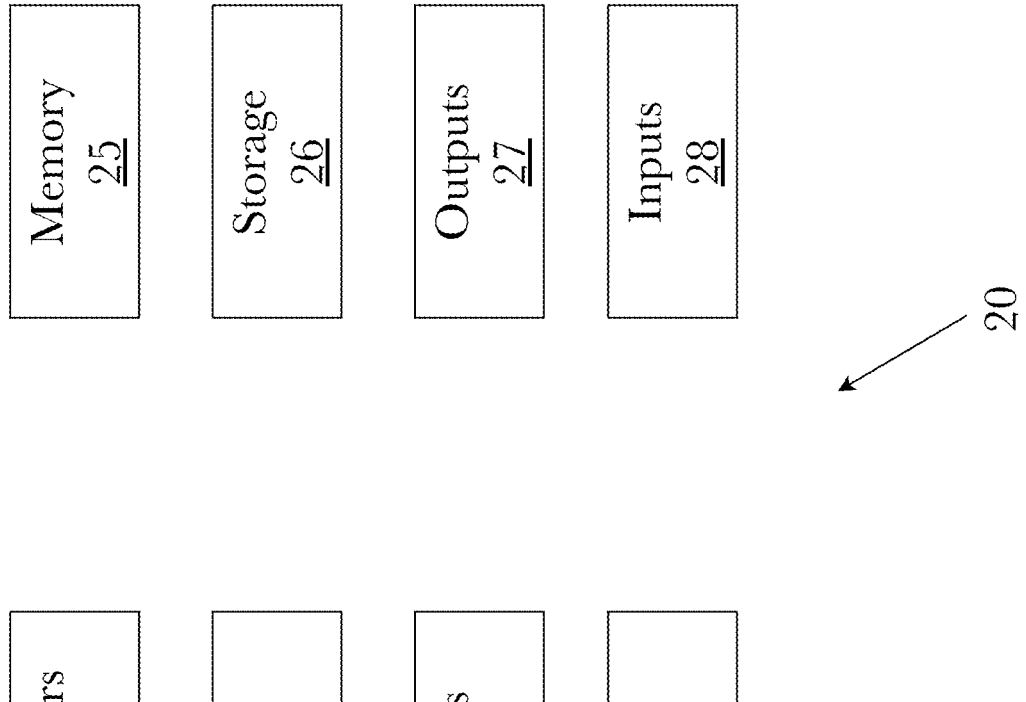

FIG. 17 is a block diagram illustrating an exemplary logical architecture for a client device.

Figure 18:
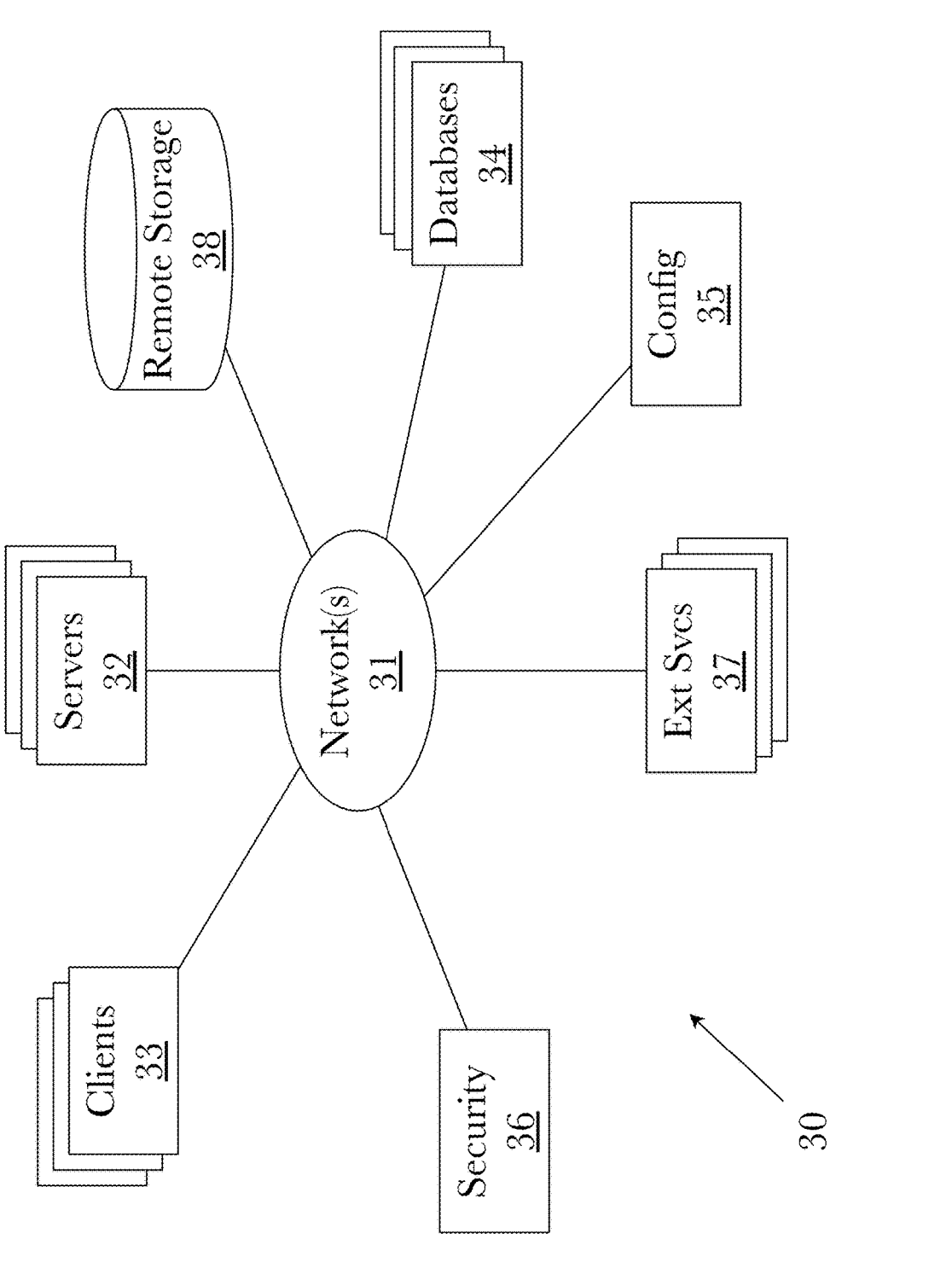

FIG. 18 is a block diagram illustrating an exemplary architectural arrangement of clients, servers, and external services.

Figure 19:
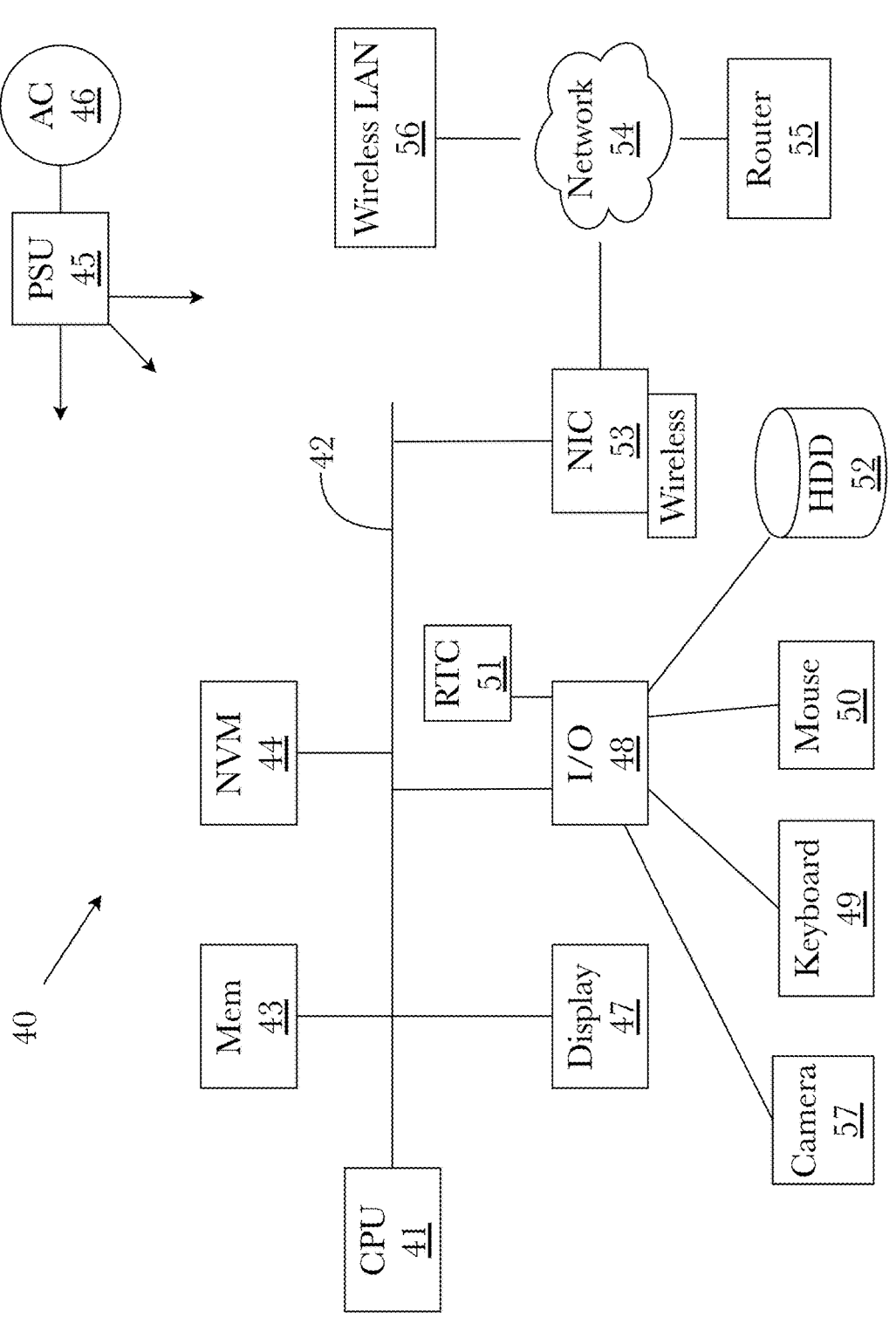

FIG. 19 is another block diagram illustrating an exemplary hardware architecture of a computing device.

DETAILED DESCRIPTION

The inventor has conceived, and reduced to practice, a system and method for automated software testing that uses machine learning algorithms to automatically generate and implement software testing based on an automated analysis of the software. In an embodiment, a mobile software application comprising one or more screens is processed through a trained machine learning algorithm to identify screens and objects, understand the operational flow of the application, define priorities and dependencies within the application, define validation tests, and automatically generate one or more testing scenarios for the application. The testing scenarios may then be fed to an automated execution module which installs the application on one or more physical or virtual devices and performs testing on the application installed on those devices according to the testing scenario.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring nonsimultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 1A:
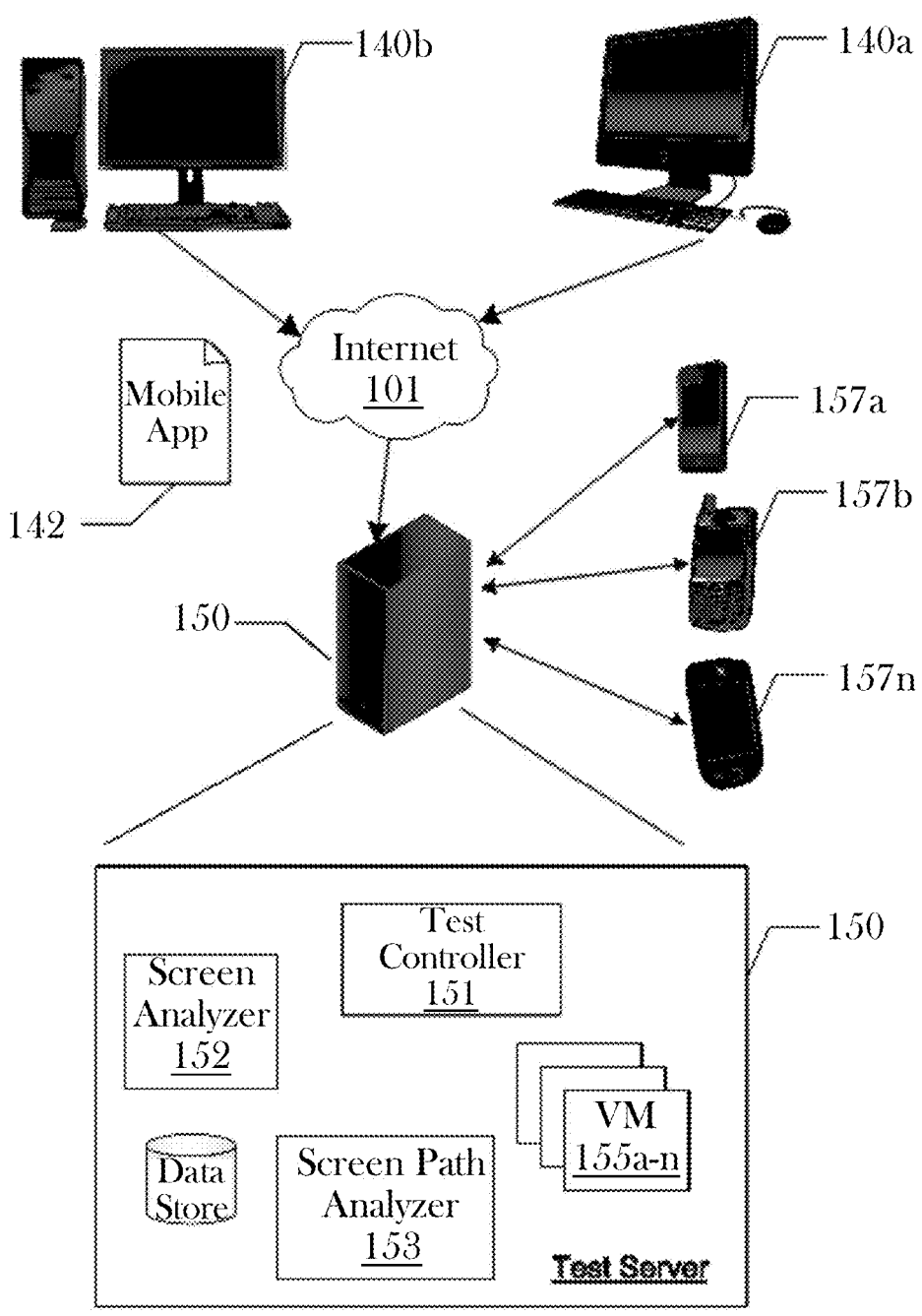
FIG. 1A is a diagram of an exemplary architecture of an intelligent mobile application testing system according to one aspect.

FIG. 1A is a diagram of an exemplary architecture of an intelligent mobile application testing system according to one aspect. A client development system 140*a*-*b* connect with test server 150 via the Internet 101 in order to test a mobile application 142. This mobile application is tested on a virtual machine 155*a*-*n* that emulates various mobile devices or on one of a plurality of mobile test devices 157*a*-*n*. Tests of the mobile application 142 occur as the test machine executes a version of the mobile application 142 that has been uploaded from one of the client development system 140*a* to the test server 150.

The mobile application 142 is received by a test controller 151 within the test server 150 and loaded into either a virtual machine 155*a* or a mobile test device 157*a*. The mobile application 142 is then executed to analyze every application screen that may be generated by the mobile application 142 while interacting with test modules, screen analyzer 152 and screen path analyzer 153 in the test server 150. These test modules exercise the available functionality of the mobile application 142 either using automated test sequences generated by the test server 150 or test commands received from a user of the client development system 140*a*. These test modules send the test sequence to the virtual machine 155*a* or mobile test machine 157*a* to emulate user interaction with the mobile application 142 and then receive results data from the testing of the application 142 for later analysis.

Test sequences proceed as needed to navigate the mobile application 142 through all of its functionality. The test sequence may utilize actual data processing data sent and received by the mobile application 142, for example, data sent to or received from a web server (not shown) as would occur when the application is used on an actual mobile device. The test sequences may focus on any set of functionalities desired by the user to ensure application testing addresses issues of interest.

Figure 1B:
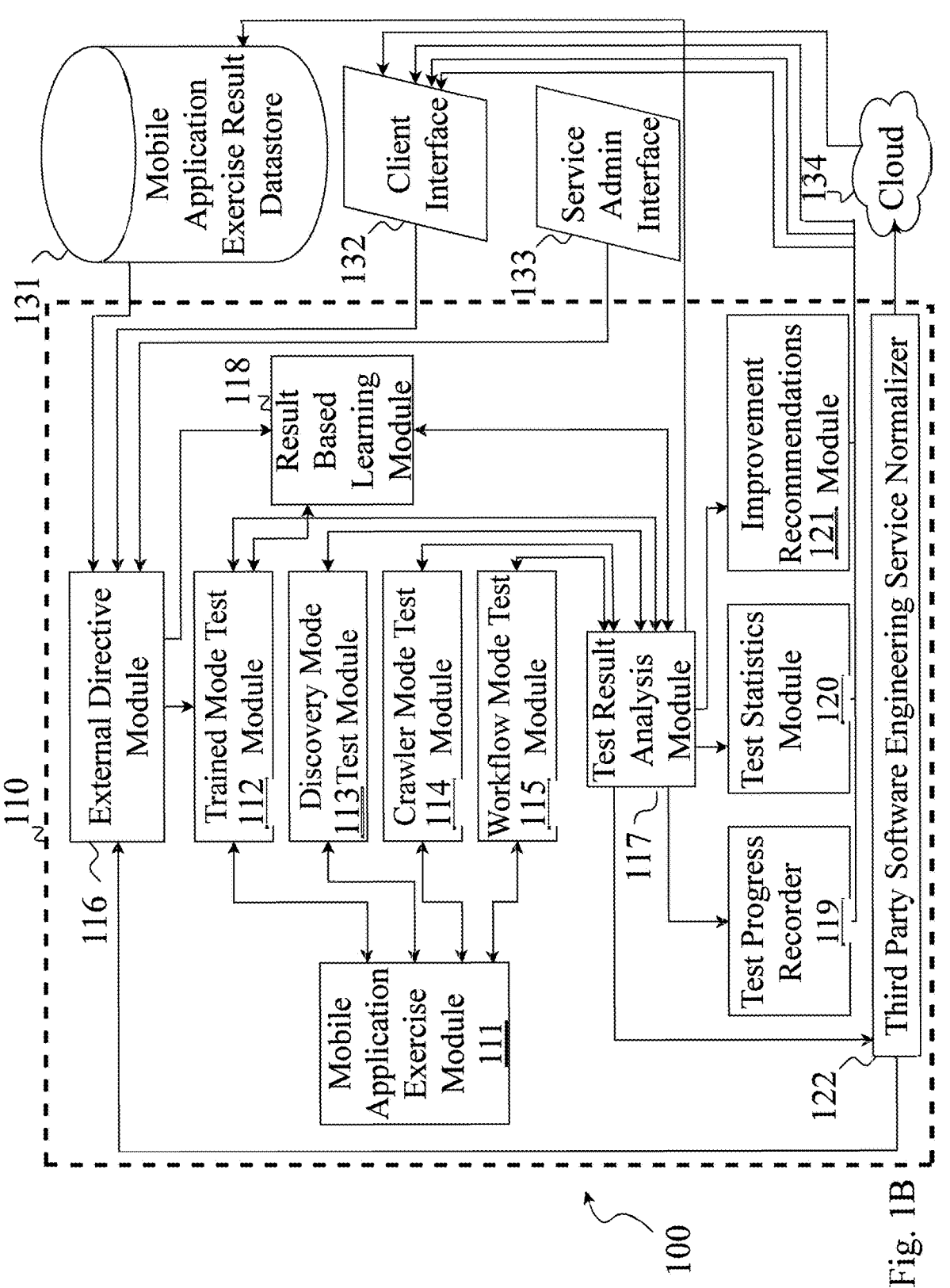
FIG. 1B is a diagram of an exemplary architecture of an intelligent mobile application testing system according to one aspect.

FIG. 1B is a diagram of an exemplary architecture 100 of an intelligent mobile application testing system according to one aspect. Mobile applications (mobile apps) to be tested by the mobile application testing system 110 may be run on a mobile app exercise module that is an integral part of the mobile application testing system 111 but the mobile app testing system is designed to allow these apps to be tested while running directly on any one of the available devices on which the mobile app is designed to run, wherein the device being tested is connected to, and directed by, the mobile application testing system 110 operating as a controller to send operation request to the operating system on the device for execution. The mobile app may be run on several different devices during the full testing process, which may test platform specific performance characteristics such as GOOGLE ANDROID™ vs. APPLE iOS™ vs. MICROSOFT WINDOWS™ mobile app versions for OS platform specific programming deficiencies; multiple individual devices representing the same OS platform which may test OS version differences in mobile app performance within the range of OS versions designated as supported by the mobile app being tested, for example iOS™ v.8 vs. v.9 vs v.10 or ANDROID LOLLIPOP™ vs. MASHMAL-LOW™ vs. NOUGAT™, just to name a few likely examples from the larger set. Further, multiple mobile devices of different supported types such as but not limited to smartphones, tablets, or wearable devices, and from different vendors such as SAMSUNG™ smartphones, tablets, smartwatches, or virtual-reality (VR) headsets of different models, LG™ smartphones, tablets, or smartwatches of different models and MOTOROLA™ smartphones or smartwatches, among the many types and models known to those skilled in the art, may be tested for differences in battery performance characteristics, graphics display failures, abnormal program ends and program progress halts, to name just a few possible mobile device model effects when using the mobile app undergoing analysis. General test suites for a mobile app category such as appointment/schedule calendar maintenance, virtual store front, social media gateway or mathematically based utility, just to name a few of many possibilities, may be pre-loaded by either a service administrator 133 or possibly the test client using a menu or some other similar choice vehicle 132 known to those skilled in the art, depending on the category into which the mobile app to be tested belongs. Under other conditions, or given other arrangements, the intelligent mobile application testing system may independently identify the category of the current test mobile app from graphic item content and action cues present on its screens. The pre-load of general test suite directives may also cause the retrieval of information generated from past tests of similar software either by the intelligent mobile application testing system or isolated stored and provided by another, external source of such information 122, normalized for intelligent mobile application testing system use and locally stored, possibly both depending on the particular arrangement or use case, from a mobile application exercise result data store 131. This information may be used to allow intelligent scrutiny of possible issues often present in the mobile app category, allow comparative usability scores to be assigned and to allow recommendations regarding the remedy of found deficiencies in the present mobile app under test to be proposed 121. The introduction into, and use of externally entered data by, is coordinated by an external directive module 116 during intelligent mobile application testing system runs. The test of a particular mobile app by the intelligent mobile application testing system may occur using any of four specialized test progression modes, although at any given instant of the test run, only one mode is active.

One such test mode is the discovery mode 113 which may be used primarily when the intelligent mobile application testing system encounters a screen (or node) of the test mobile app of new or unknown functionality. When that condition is met, the software engineered mechanism that the intelligent mobile application testing system uses to traverse and exercise the screens and user interface (UI) elements of the test mobile app, herein subsequently called a bot, assesses which UI components of the node may receive interactive user commands. For example, which components may respond to click or tap commands, which components may receive text input and which component or components may respond to more complex gestures such as swipes, flicks or pinches, just to name a few of the many possible gestures available to a mobile app programmer. For each screen reference to each UI component, whether it responds directly or possibly indirectly to some form of user interactive command, and its position on the screen is saved as part of the screen's node representation internal to the intelligent mobile application testing system. The discovery mode assessment is partially done from standard automation information, but standard information may be very limited and, in some cases, may be entirely incorrect. Therefore, the invention includes heuristic programming algorithms that improve the accuracy of determining what interaction commands are possible on the screen. This is generally based on such cues as the type of control(s) used to implement the screen layout and content, and where on the screen to simulate the interaction command although this list is not meant to limit the types of interactions investigated by the invention. For example, sometimes a child control is reported to be unresponsive to interaction commands but it has a parent or ancestor control that is registered to respond to commands. Depending on the control types of the ancestor and the parent, this may be a clue to not direct the command to the ancestor control but to the child instead. The reason is based upon a generally good guess that a child control has a higher z-order in the UI layout than the ancestor control. With a higher z-order, the child control is on top of the ancestor. Therefore, scenarios where this is the case are searched for, and if so the command is directed to the child control even though the child control is reported to be unresponsive. This works because the ancestor control acts as a surrogate, and eventually receives and processes the command as long as it originated from within the x & y coordinate boundaries of the child control and no other dependent child control has an even higher z-order than the target control. Of course, the previous is just one of multiple possible examples of how the heuristic programming embodied in the invention may allow greater interactive feature investigation by better reproducing the actions a human user may perform during use than by just randomly activating interactive elements, but the example should in no way be interpreted to limit the invention to identifying and correctly traversing similar UI construction methods. Next the bot must decide what action or actions should be taken in order to exercise this portion of the application and/or discover additional functionality further into the application. This decision may be aided using both intra-mobile app predictive analytics provided by any existing test results 117 and any learning allowed by the synthesis of those results into predictive insight 118, and any previous data retrieved on similar mobile apps 131 and made available to the system 116. Once a set of actions are thus determined, the bot makes an assessment regarding success or failure regarding the actions taken. In discovery mode, success is achieved if each of the following hold true: the application did not crash; the application did not throw any exceptions; the application did not popup an error message to the UI; and, the screen has changed in some way regarding either control composition or content when compared to the screen present before any actions were taken. Otherwise it is recorded that an application failure has occurred because of activation of the tested interactive component. This information is sent to the in the raw result analyzer 117. Regardless of success or failure, the bot continues in discovery mode which means it tries to continue to explore the application for pathways that have not yet been traversed.

A second test mode which may be used by aspects of the invention is crawler mode 114. Crawler mode is invoked when the bot is traversing through a mobile app, and arrives at points in a mobile app where "forward exploration" is no longer possible. Therefore, the bot needs to go back to a previously known node in the mobile app in order to explore other areas of the mobile app that have not been explored or have been only partially explored. Such reverse traversal may be as simple as the going to the previous screen using an available back button interactive component, but in many cases traversal through nodes is not linear. So "going back"

may not provide much utility. Also, some mobile apps do not support a "back" button at all. The system thus uses a statistical weighting of all unexercised UI components under these circumstances. The system creates a ranking of the likelihood of how much functionality sits behind each UI component to select a current node resident interactive component with the highest probability of leading to a previously mapped area of the mobile app. Once the target UI component is chosen, then an application graph constructed by linking mobile app screens together in a multi-dimensional graph represented relationship is used to determine the location of the test bot within the mobile app node structure and the action steps needed to traverse known paths from the current node in the mobile app to a desired node where still unexplored UI components may be accessed. Also, some paths within a test mobile app may be either transient or unidirectional, so the bot's first attempt to determine the sequence of pathways may not always yield an expected result. Therefore, the bot must recognize differences in application behavior from expected behavior, update the multidimensional graph of mobile app nodes accordingly, and devise a new strategy for navigating through the application to the desired node. This process repeats until the desired node is reached.

A third testing mode that may be used by aspects of the intelligent mobile application testing system, training mode 112 is invoked when one or more nodes of the mobile app require specific text information such as but not limited to a username, password, name of a particular object or name of a person of geographical location; a specific activation sequence of multiple interactive UI components of other set of actions specific to an individual or group known to those skilled in the art. To traverse such specific types of interface elements where trial and error using random text entry or UI component activation will not result in successful traversal of a screen of the mobile app, the client may elect to teach the intelligent mobile application testing system the interaction information required using the client interface 132, which is shown in this arrangement as being local to the test system for illustrative purposes, but may also be remote and connected over an network including a VPN tunneled on the internet 134. In action, the bot may be explicitly trained for an exact set of actions on a particular screen, if desired. The client may use the client interface portal 132 to identify the application screen on which it wants to train the bot by visually selecting UI control components one by one, specifying the correct action to be performed by the test system at that control and/or entering any specific value to populate into the control in the cases of text responses. Each screen is a unique node in the application multi-dimensional graph. So, the trained action and values is created under the graph point specified by the combination of the node identifier plus the unique UI control component identifier. When the bot is running and encounters a matching node and control(s), the trained actions and values are used by the bot to traverse through that node of the application.

A last testing mode that may be used by the aspects of the intelligent mobile application testing system is a workflow mode 115. Two workflow types are modelled by the intelligent mobile application testing system. One type involves a series of actions that span multiple screens (nodes) to complete a task. A good example is the "check-out" process for a store front application. Typically, there are multiple screens, one asking for shipping information, then one for billing information, one for confirmation of items in the shopping basket, and then finally a screen to review an order a final time in its final form and submit the order, at which time the customer has committed to the order items and her credit card or bank account is charged. This type of workflow requires many action steps before determining success or failure of the task. A second type of workflow is where actions taken on one screen may only be verified for success or failure on another screen. For example, an appointment application allows you to create a new appointment specifying such items as an appointment name, location, date, time, and duration, among other possible pieces of information. But to determine whether the entry is logged correctly often requires traversal to the correct month, day, and time of day to verify if the appointment is showing correctly. The first type of workflow may be detected by looking for a combination of textual and navigational hints. For example, text labels in the node match a dictionary of likely candidates (phone, address, and billing, among other possibilities.). Multiple text input fields on the same screen. And navigational buttons or links labelled next, previous, continue, etc. Determining success or failure for the workflow is reserved until there is a screen that denotes a completed flow, such as "order placed" or "reservation made." The invention is programmed to successfully fully exercise this type of workflow using standard testing store front protocols and to identify and report and deficiencies or deviations from expected results both catastrophic, where the application crashes or the process never successfully completes, and more subtle, where use of a back button or entry of incomplete information on a screen results in order reset, double charge or other failure states familiar to those skilled in the art which allow a user to progress in use of the mobile app but mildly to significantly diminish the usability of the tool from the point of view of the user. The second type of workflow is detected from the context of creating a new item inside the mobile app, such as an appointment or new contact. Attributes from the create new item context are used to find the item elsewhere in the application. For example, the date and time of an appointment or the name of a contact. Again, the invention includes programming to identify, traverse and exercise this second type of workflow as outlined directly above. Abnormal program ends, program progress halts, and more subtle failures which may include failure to transfer schedule or other list data from an input screen to the correct among other defects known or likely to diminish user experience are captured and analyzed.

Regardless of the testing mode that the system uses, test results are normalized and interpreted within the test result analysis module 117. This module receives raw results from the bots working in any mode and analyzes them for known success or failure indicators as well as previously uncharacterized deviation from expected UI interactive component behavior. Analysis may make use of the analytic capabilities of the results based learning module 118 to predictively interpret the significance of unknown result data. Analyzed result data for a mobile app may be permanently stored in the mobile application exercise result data store 131 for both later retrieval and review and possibly for use as a usability characteristic reference during testing of similar mobile apps. The raw bot generated data may also be stored in the data store 131 for future re-analysis or review as new resources become available. Analyzed result data, raw bot data or both may also be transmitted to a client's software engineering issue tracking system such as: JIRA™ BUGZILLA™, SLACK™, and VSO™ to name a subset of the trackers available as normalized for transmission 134 to each of these services through the third-party software engineering service normalizer 122. This allows mobile app test results to serve as a part of the client's overall software management schema rather than an isolated, add-on service that must then be manually integrated into client workflow. The utility of the intelligent mobile application testing system to software—software engineering issue tracking system communication channel is augmented in that various aspects of the invention are designed to accept updated mobile app code and testing directives from the client through the third-party software engineering service normalizer 122 and will then exercise the new mobile app revision for issues including reversions. Analysis results are passed on to a test progress recorder 119 to provide clients with an indication of what screens have been tested and what is still left to complete as well as certain meaningful interim results, if available. The system also uses test results analyzed using preprogrammed mobile app data metrics for a plurality of core functions to provide clients with standalone usability statistics, statistics indicating the mobile app's stability when subjected to specific challenges and usability in comparison to other mobile apps in the same category among other statistics known useful to those skilled in the art but not listed for brevity's sake 120. A client may get more detailed descriptions of application abnormal ends, loss of responsivity issues, slow responsiveness, as well as subtler usability issues, possibly including the program instructions that form the root cause that may be presented in a client controllable video format that provides the exact mobile app screen status images with synchronized internal program instructions and key variable values which may be finely controlled for both playback location and playback speed through the services of the improvement recommendations module 121 which will also, when appropriate and available, provide recommendations on how an issue may be resolved. All information produced by the test statistics module 120 and improvement recommendations module 121 may be permanently saved in a data store record for the mobile app tested 131 as well as being directly displayed to the client 134, 132.

Figure 2:
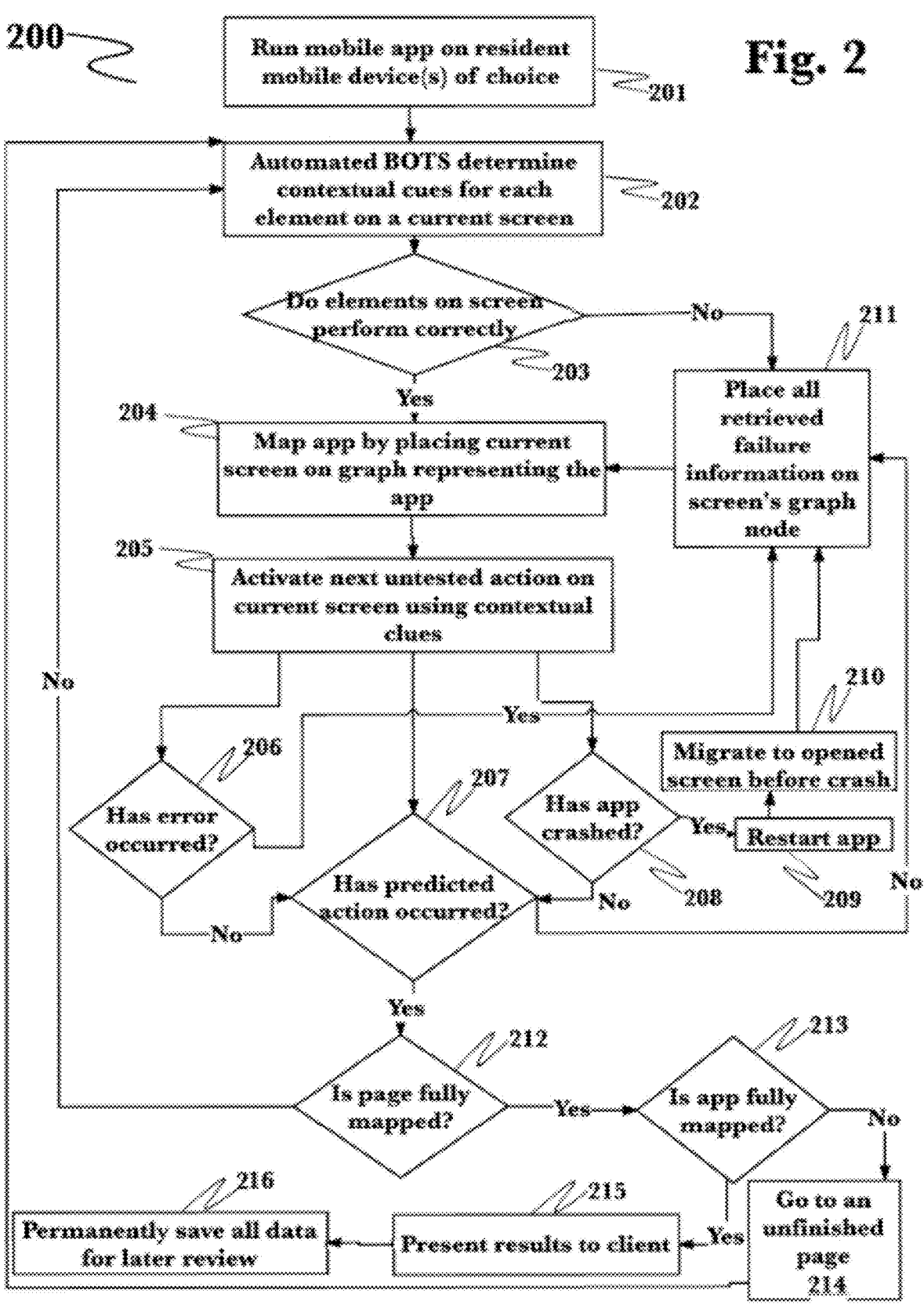
FIG. 2 is a method flow diagram of the function of the intelligent mobile application testing system according to one aspect.

FIG. 2 is a method flow diagram 200 of the function of the intelligent mobile application testing system according to one aspect. While some arrangements may run a test mobile app on a dedicated module which is integral to the intelligent mobile application testing system 111, it is expected that mobile apps will be tested on a plurality of the mobile devices available from the plurality of manufacturers present at the time of testing using the native operating system of those devices such as but not necessarily limited to APPLE IOS™, GOOGLE ANDROID™, and MICROSOFT WINDOWS™ and under installation and execution control of the intelligent mobile application testing system through standard automation APIs 201. Automated bots then crawl through the mobile app under test such as using contextual hints that are part of the mobile app's screen (also referred to as "node" here within) progression, types of UI elements present on a screen and UI interactive element placement in that progression, among other hints known to those skilled in the art, and both previously learned mobile app traversal logic and explicit human directives pertaining to the successful traversal of certain UI elements found in the current mobile app where specific information of element activation progression may be needed to simulate human like interactions for each element within the mobile app 202. Responses to UI element exercise may be tested 203 against preprogrammed, learned or client provided expected results for that element to determine whether the element functions correctly. Unexpected results are recorded on a graphical representation of the mobile app generated by the intelligent mobile app test system along with other data pertaining to the current screen or node 211. Regardless of whether unexpected behavior is found with an element, the intelligent mobile app test system works to completely map each element's function and node relationships for the entire mobile app 204 by activating each UI interactive element present on each screen encountered 205. This mapping of a mobile app by the intelligent mobile application testing system may occur using four specialized test progression modes, although at any given instant of the test run, only one mode is active.

One such test mode is the discovery mode 113 which may be used primarily when the intelligent mobile application testing system encounters a screen of the test mobile app of new or unknown functionality. When that condition is met, the bot assesses which UI components of the node may receive interactive user commands. For example, which components may respond to click or tap commands, which components may receive text input and which component or components may respond to more complex gestures such as swipes, flicks or pinches, just to name a few of the many possible gestures available to a mobile app programmer. For each screen reference to each UI component, whether it responds directly or possibly indirectly to some form of user interactive command, and its position on the screen is saved as part of the screen's node representation internal to the intelligent mobile application testing system. The discovery mode assessment is partially done from standard automation information, but standard information may be very limited and, in some cases, may be entirely incorrect. Therefore, the invention includes heuristic programming algorithms that improve the accuracy of determining what interaction commands are possible on the screen. This is generally based on such cues as the type of control(s) used to implement the screen layout and content, and where on the screen to simulate the interaction command although this list is not meant to limit the types of interactions investigated by the invention. For example, sometimes a child control is reported to be unresponsive to interaction commands but it has a parent or ancestor control that is registered to respond to commands. Depending on the control types of the ancestor and the parent, this may be a clue to not direct the command to the ancestor control but to the child instead. The reason is based upon a generally good guess that a child control has a higher z-order in the UI layout than the ancestor control. With a higher z-order, the child control is on top of the ancestor. Therefore, scenarios where this is the case are particularly searched for, and if so the command directed to the child control even though the child control is reported to be unresponsive. This works because the ancestor control acts as a surrogate, and eventually receives and processes the command as long as it originated from within the x & y coordinate boundaries of the child control and no other dependent child control has an even higher z-order than the target control. Of course, the previous is just one of multiple possible examples of how the heuristic programming embodied in the invention may allow greater interactive feature investigation by better reproducing the actions a human user may perform during use than by just randomly activating interactive elements, but the example should in no way be interpreted to limit the invention to identifying and correctly traversing similar UI construction methods. Next the bot must decide what action or actions should be taken in order to exercise this portion of the application and/or discover additional functionality further into the application. This decision may be aided using both intra-mobile app predictive analytics provided by any existing test results 117 and any learning allowed by the synthesis of those results into predictive insight 118, and any previous data retrieved on similar mobile apps 131 and made available to the system 116. Once a set of actions are thus determined, the bot makes an assessment regarding success or failure regarding the actions taken. In discovery mode, success is achieved if each of the following hold true: the application did not crash 208; the application did not throw any exceptions 206; the application did not popup an error message to the UI 206; and, the screen has changed in some way regarding either control composition or content when compared to the screen present before any actions were taken 207. Otherwise it is recorded that an application failure has occurred because of activation of the tested interactive component which is saved as part of the element's node in the mobile app's multidimensional graph representation 211. Regardless of success or failure, the bot continues in discovery mode which means it tries to continue to explore the application for pathways that have not yet been traversed.

A second test mode which may be used by aspects of the invention is crawler mode 114. Crawler mode is invoked when the bot is traversing through a mobile app, and arrives at points in a mobile app where "forward exploration" is no longer possible. Therefore, the bot needs to go back to a previously known node in the mobile app to explore other areas of the mobile app that have not been explored or have been only partially explored. Such reverse traversal may be as simple as the going to the previous screen using an available back button interactive component, but in many cases traversal through nodes is not linear. So "going back" may not provide much utility. Also, some mobile apps do not support the "back" button at all. The system thus uses a statistical weighting of all unexercised UI components under these circumstances. The system creates a ranking of the likelihood of how much functionality sits behind each UI component to select a current node resident interactive component with the highest probability of leading to a previously mapped area of the mobile app. Once the target UI component is chosen, then an application graph constructed by linking mobile app screens together in a multidimensional graph represented relationship is used to determine the location of the test bot within the mobile app node structure and the action steps needed to traverse known paths from the current node in the mobile app to a desired node where still unexplored UI components may be accessed. Also, some paths within a test mobile app may be either transient or unidirectional, so the bot's first attempt to determine the sequence of pathways may not always yield an expected result.

Therefore, the bot must recognize differences in application behavior from its expected behavior, update the multidimensional graph of mobile app nodes accordingly, and devise a new strategy for navigating through the application to the desired node. This process repeats until the desired node is reached.

A third testing mode that may be used by aspects of the intelligent mobile application testing system, training mode 112, is invoked when one or more nodes of the mobile app require specific text information such as but not limited to a username, password, name of a particular object or name of a person of geographical location; a specific activation sequence of multiple interactive UI components of other set of actions specific to an individual or group known to those skilled in the art. To traverse such specific types of interface elements where trial and error using random text entry or UI component activation will not result in successful traversal of a screen of the mobile app, the client may elect to teach the intelligent mobile application testing system the interaction information required using the client interface 132, which is shown in this arrangement as being local to the test system for illustrative purposes, but may also be remote and connected over an network including a vpn tunneled on the internet 134. In action, the bot may be explicitly trained for an exact set of actions on a particular screen, if desired. The client may use the client interface portal 132 to identify the application screen on which it wants to train the bot by visually selecting UI control components one by one, specifying the correct action to be performed by the test system at that control and/or entering any specific value to populate into the control in the cases of text responses. Each screen is a unique node in the application multi-dimensional graph. So, the trained action and values is created under the graph point specified by the combination of the node identifier plus the unique UI control component identifier. When the bot is running and encounters a matching node and control(s), the trained actions and values are used by the bot to traverse through that node of the application.

A last testing mode that may be used by various aspects of the intelligent mobile application testing system is a workflow mode 115. Two workflow types are modelled by the intelligent mobile application testing system. One type involves a series of actions that span multiple screens (nodes) to complete a task. A good example is the "check-out" process for a store front application. Typically, there are multiple screens, one asking for shipping information, then one for billing information, one for confirmation of items in the shopping basket, and then finally a screen to review an order a final time in its final form and submit the order, at which time the customer has committed to the order items and her credit card or bank account is charged. This type of workflow requires many action steps before determining success or failure of the task. A second type of workflow is where actions taken on one screen may only be verified for success or failure on another screen. For example, an appointment application allows you to create a new appointment specifying such items as an appointment name, location, date, time, and duration, among other possible pieces of information. But to determine whether the entry is logged correctly often requires traversal to the correct month, day, and time of day to verify if the appointment is showing correctly. The first type of workflow may be detected by looking for a combination of textual and navigational hints. For example, text labels in the node match a dictionary of likely candidates (phone, address, and billing, among other possibilities.). Multiple text input fields on the same screen. And navigational buttons or links labelled next, previous, continue, etc. Determining success or failure for the workflow is reserved until there is a screen that denotes a completed flow, such as "order placed" or "reservation made." The invention is programmed to successfully fully exercise this type of workflow using standard testing store front protocols and to identify and report and deficiencies or deviations from expected results both catastrophic, where the application crashes or the process never successfully completes, and more subtle, where use of a back button or entry of incomplete information on a screen results in order reset, double charge or other failure states familiar to those skilled in the art which allow a user to progress in use of the mobile app but mildly to significantly diminish the usability of the tool from the point of view of the user. The second type of workflow is detected from the context of creating a new item inside the mobile app, such as an appointment or new contact. Attributes from the create new item context are used to find the item elsewhere in the application. For example, the date and time of an appointment or the name of a contact. Again, the invention includes programming to identify, traverse and exercise this second type of workflow as outlined directly above. Abnormal program ends, program progress halts, and more subtle failures which may include failure to transfer schedule or other list data from an input screen to the correct among other defects known or likely to diminish user experience are captured and analyzed 206.

During the course of analysis, it is possible that a mobile app may abnormally end due to a catastrophic error 208. Under these circumstances, the intelligent mobile app testing system is designed to first recognize this condition and, as no further mapping and analysis of the mobile app would be possible in that state, restart the mobile app 209 placing a bot on the last known active screen 210 and recording both the UI element's failure along with all available diagnostic information for the element on that screen's graph node 211 as well as insuring that the defective element is avoided. The progression of fully mapped screens 212, 214 eventually will result in the full mapping of the mobile app 213 at which time the results may be presented in the client 215, possibly in the form of statistics for stability, instantaneous and predicted resource usage on the host device of mobile app functions, standalone usability, and comparative usability with other known mobile apps in the same category among other statistics known to those skilled in the art. Another form of presentation may be a finely controllable video representation of the bot's activities during mobile app mapping including available machine state information of selected interest to the client with the ability to zoom to areas of unexpected programming behavior including program stops and abnormal ends among other possible defects. These could then be reviewed "frame by frame" to allow troubleshooting of the issue. More extensive dumps of mobile device memory may also be sent to the client's software engineering package 122 to aid in correction, if desired. All data may also be saved to a data store 131 for later review 216.

Figure 3:
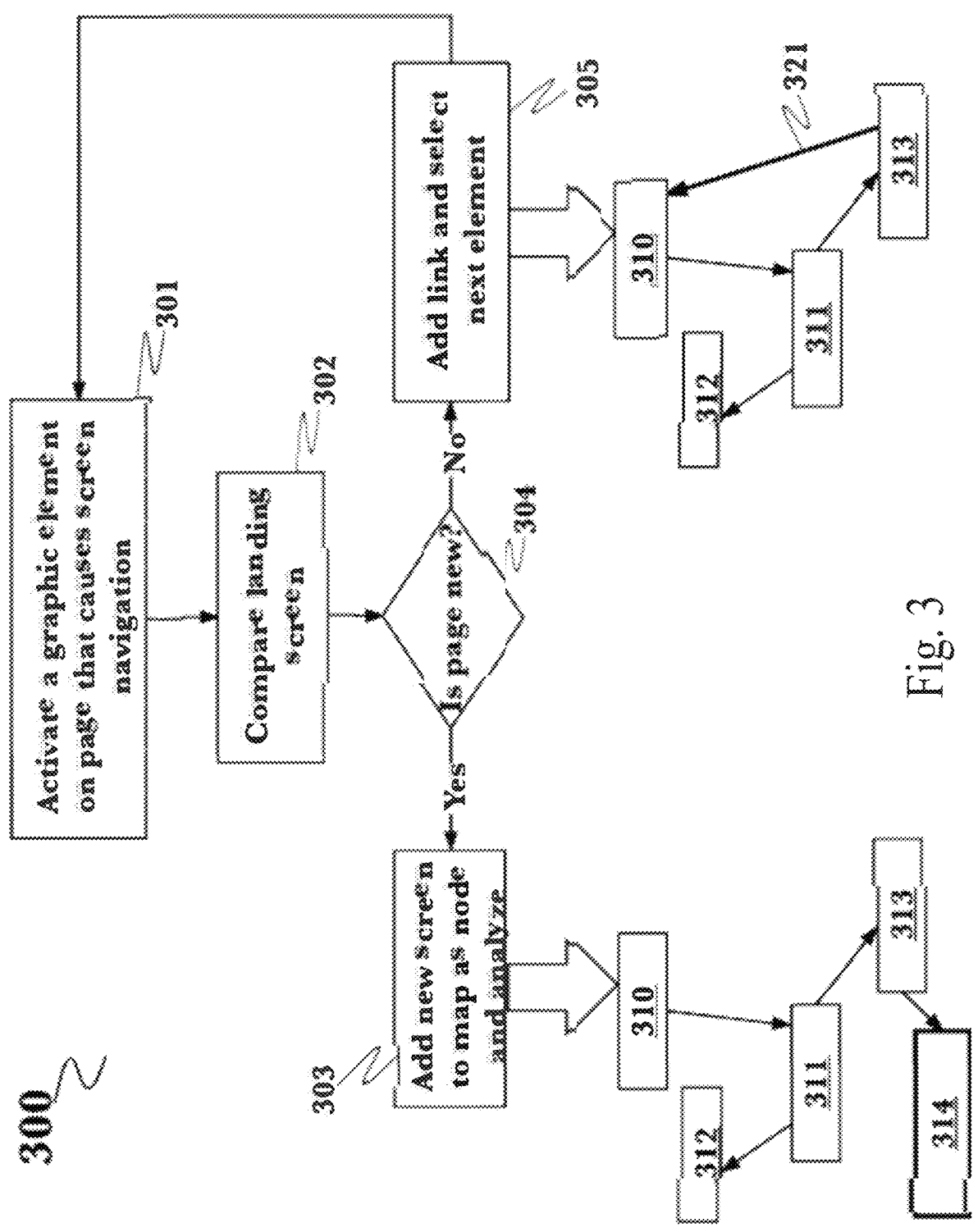
FIG. 3 is a flow diagram of an exemplary function of the intelligent mobile application testing system for mapping the navigational relationships between pages of a mobile application.

FIG. 3 is a flow diagram 300 of an exemplary function of the intelligent mobile application, testing system for mapping the navigational relationships between pages of a mobile application according to one aspect. An important aspect of analyzing the function any mobile app is an accurate representation of the relationships between the mobile app's screens (which may also be referred to as "nodes" herein). The intelligent mobile app testing system performs this mapping by activating each UI interactive element on each screen starting with the first screen presented upon mobile app startup 301. This first screen is given the top node representation 310 in a multidimensional map that the system creates as it does its mapping. The resultant screen of a UI interactive element 311, 312, 313, if screen navigation is the UI element's action, is compared to all previously encountered pages 302 and if the screen has not previously been encountered 304, a new node is created and added to the map 303 for the new screen 314, placed in dimensional relationship to previously created nodes by contextual clues encountered during previous mapping of mobile app and predictive analytic learning. Analysis of the UI elements on the new screen is then begun possibly employing contextual cues, explicit human directives for that screen and prior predictive analytic learning which may include but is not limited to inferential statistics, linear regression, decision trees and data feedback loops to best mimic human interaction. New nodes are thus added until all screens of the mobile app are discovered and added to the graph type mapping. Activation of an interactive UI element may also cause a bot, and therefore, by extension a human user to be taken to a previously encountered screen 304 for multiple mobile app design reasons. During mobile app testing, such an eventuality may cause only a new link 321 (line darkened only for illustrative emphasis) between the source node and the target node to be created. If unanalyzed interactive UI elements exist on the previously graphed landing node, the bot will then concentrate on characterizing one or more of those elements until taken to another mobile app screen 305. Multidimensional graphical mapping continues until all interactive UI elements have been analyzed and no further links are found present.

FIG. 4 is an illustration of an analysis summary screen 400 for a page of a hypothetical mobile application produced as part of the function of the intelligent mobile application testing system as per one aspect. To be useful data resultant of any analysis is best presented in formats that are both intelligible to the recipient of that data and in such ways that the data may be quickly digested with the possibility of exposing greater detail should the recipient desire. Shown here is one possible static type display of data created by an aspect of the invention of the plurality that may be created to summarize the functional status of a mobile app's UI elements 410, 415. Here, the client may select the node 311, or screen of interest 410 from the multidimensional graph representation created by the system (see FIG. 3) 405. Node selection here brings up a display of the selected mobile app screen 410 with its UI elements labeled for later reference (410A, 410B, 410C, 410D, 410E, 410F) 415. The screen 410 is a simplified representation of an item search and selection screen that may display in the early-mid screen progression of a shopping app. UI element 410A may show the available items for purchase once a merchandise category is selected elsewhere. The item to be displayed 410A being controlled by elements 410C which is to cause the display of the next item in the merchant's inventory offerings for the category and 410B which causes the display of the previous item in the merchant's inventory offerings for the category, together meant to allow full access to available category items. UI element 410D is meant to allow the mobile app user to add an item of choice for purchase to a virtual shopping cart, displayed on another screen accessed by the activation of UI interactive element 410F. The mobile app user may also return to the preceding screen 410E, for example to change merchandise categories once all desired selections in the current category are made, although other possible reasons for returning to the previous page may exist.

Below the graphical representation 410 of the client selected node 311 is a list type summary display of the results of intelligent mobile app testing system analytical exercise of the mobile app screen chosen by the client 415. The list includes a UI element's reference 415a (A, 401A) from the screen graphic representation panel 410, a short description of the activity ascribed to the UI element by the testing system 415a1 and a brief descriptor of the test system's functional findings for that element 415a2, which for 415a indicates that no functional issues were found. From the display, it may be quickly determined that most of the UI elements for node 311 exhibits only expected behaviors and are given a "Functional" designation. UI element 410E, however is reported by the testing system to have had a possibly serious action programming defect as using the "Back" UI interactive element to return designated previous page results in the loss of items already added to the cart 415b. A client may then choose to display more detailed information on the defect by activating an icon present next to the reported issue 415c. The expanded detail may be displayed in manners such as but not limited to a pop-up window that opens on the same testing system test result page as the summary, opens a new page to display the results interactively where multiple layers of increasing detail may be available, sending all pertinent detail information to the clients software engineer issue tracking system or other actions familiar to those skilled in the art for displaying or queuing such information for action.

Figure 5:
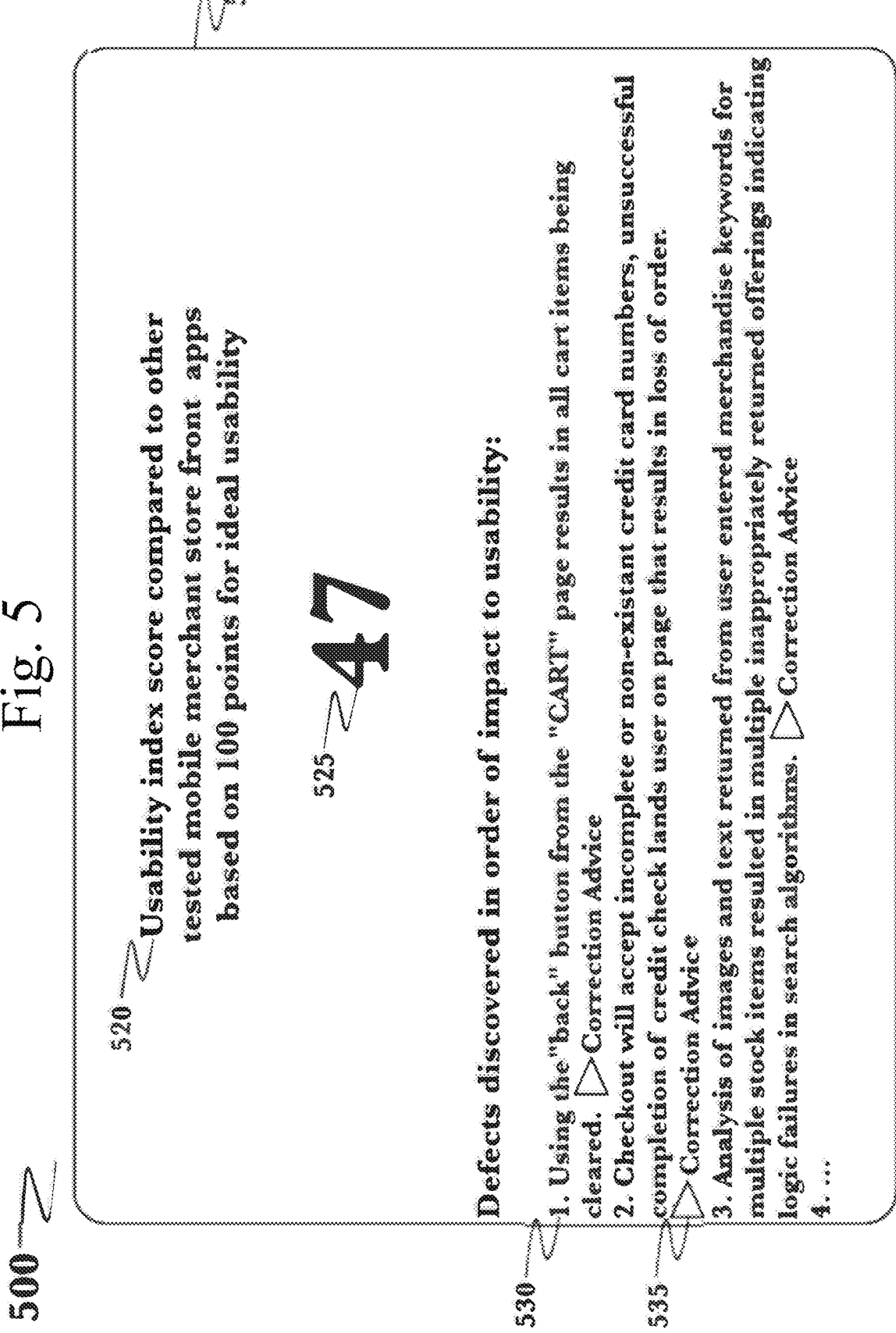
FIG. 5 is an example mobile application usability summary screen produced as part of the function of the intelligent mobile application testing system according to one aspect.

FIG. 5 is an example mobile application usability summary screen 500 produced as part of the function of the intelligent mobile application testing system according to one aspect. The system also uses information supplied by either previous mobile app test results or supplied from other sources if available, to rate the usability of the current test mobile app. Usability summaries may be standalone usability ratings calculated using metrics for the expected behaviors of standard interactive UI elements that are present in the test mobile app, or comparative usability against overall other mobile apps in the same mobile app category, merchant storefront apps being a non-exclusive category example. A comparative usability report display 510 may contain a header stating the category chosen by the test system and which may also establish the rating range used 520. The current test mobile apps comparative usability score may then be given 525 followed by a list of test system findings which contributed to the score. These factors may occasionally be positive if the mobile app author has used a particularly effective, efficient or innovative method, perhaps combinations of all three characteristics, to accomplish a function of the mobile app (not shown) but will usually be a list of defects of deficiencies that could or need to be improved to better the mobile app 530. In addition to the probable listing of items in need of correction, each item may provide a mechanism 535 by which the client may receive more specific programming issues that may have led to the negative finding as well as possible information on how to affect the corrective change or changes to remedy each deficiency found. These data may be displayed by pop-up window on the same client display screen or activation of the icon to display the advice information 535 may open a dedicated window, possibly offering a hierarchy of corrective information detail for the client to choose at their discretion. The client may also be given an option to send all pertinent intelligent mobile app testing system discovered programming, machine state and remediation advice text for one or more of the reported defects 530 to their software engineer package for inclusion into the client's standard bug tracking policy.

Figure 6:
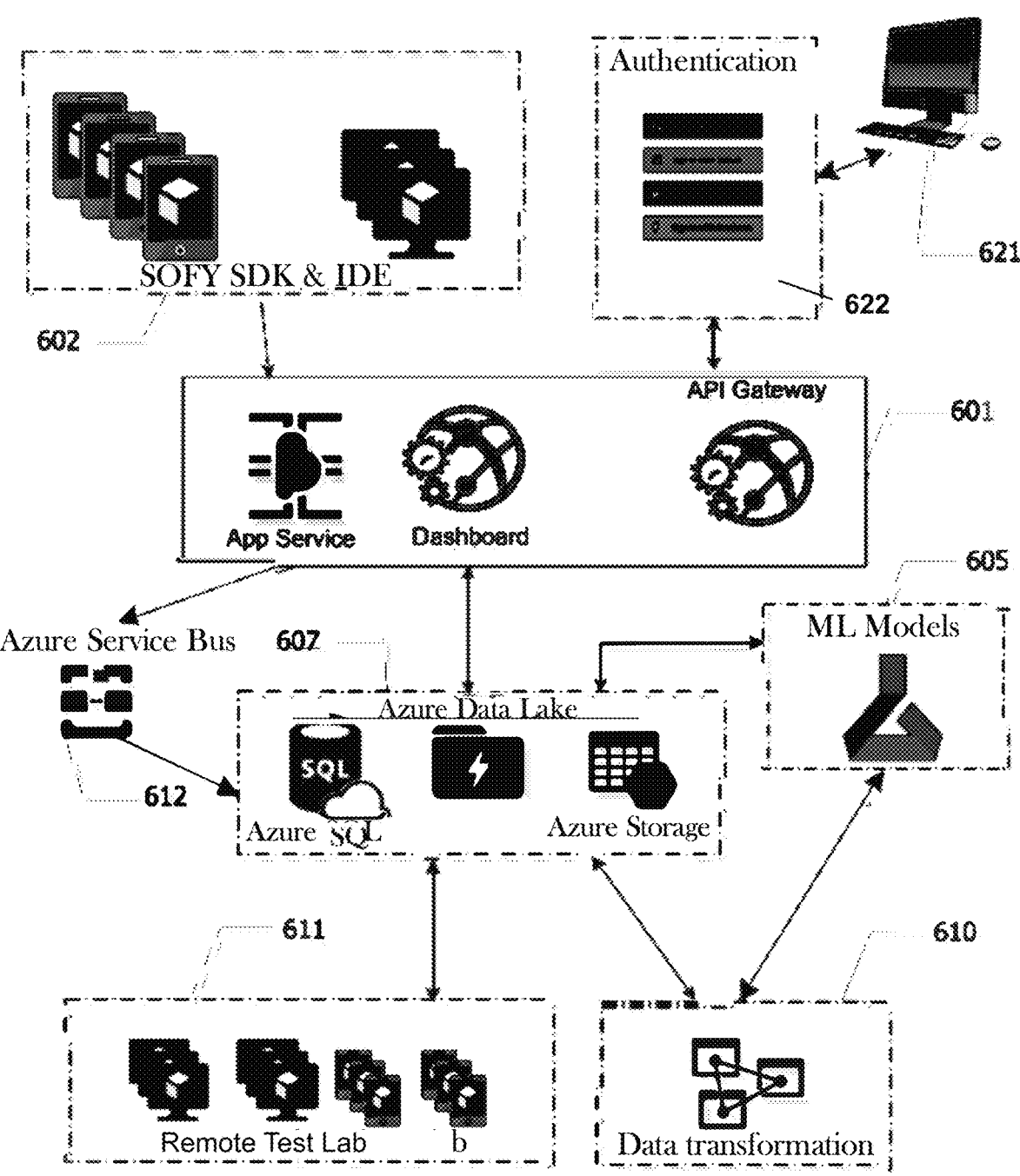
FIG. 6 is an example processing architecture of an intelligent mobile application testing system according to one aspect.

FIG. 6 is an example system architecture for an intelligent mobile application testing system. In this embodiment, a client development system 621 interacts with the system via a cloud-based portal 601 comprising an API gateway, a dashboard, and an app service that provides access to a developer module 602 comprising a software development kit (SDK) and an integrated development environment (IDE). The cloud-based portal 601 also connects to a backend comprised of several components including a service bus 612, cloud-based storage 607, one or more machine learning algorithms 605, a data transformation service 610, and a remote test lab 611 comprising a combination of virtual-machine-based mobile devices and actual physical mobile devices.

The service bus 612 that acts as an intermediary service to provide connectivity and smooth communications between the test system 601 and testing modules 607.

A developer at the client development service 621 may securely access the cloud-based portal 601 using an authentication component 622 that implements one or more known authentication and authorization protocols. Mobile applications for testing may be uploaded to the system via a cloud-based portal 601. The developer then accesses the developer module 602 to either create testing scenarios using the IDE or using a "record and play back" feature of the IDE which captures on-screen interactions as they occur. The developer also has the option of integrating the SDK with the application to capture actual customer usage scenarios and data. In this option the developer uses the SDK to add a software agent to the application, which records actual customer usage data from mobile devices and periodically transmits it back to the system through the API gateway of the service bus 612 for storage, analysis, and testing. The transmission of actual customer usage data is transmitted securely using the authentication component 622 and API keys. The storage of the actual customer usage data is stored in the cloud-based storage 607, along with testing scenarios developed by the developer.

One or more machine learning algorithms 605 may be applied to the applications and testing scenarios to identify types of testing scenarios that are typically applied to certain types of mobile applications and/or to certain pages or screens within applications. After a given machine learning algorithm 605 has received sufficient training data through this process, it may then be applied to generate recommended testing scenarios for newly-uploaded applications, even where the developers have not created any testing scenarios for those applications and the system has not yet received actual customer usage data for those applications.

After testing scenarios have been developed for an application the application is ready for testing. The application is uploaded to the remote test lab 611 where it is installed on a variety of remote test lab 611 mobile devices. The remote test lab 611 mobile devices may be virtual mobile devices operating on a virtual machine, or may be real, physical mobile devices attached to the system, or a combination of both. Ideally, the remote test lab 611 mobile devices will comprise devices of different brands (e.g., Samsung, Apple, Huawei), different hardware versions or generations (e.g., iPhone 9, iPhone 10, iPhone 11), different operating systems (e.g., iOS, Android), and even different operating system versions (e.g., iOS 11, iOS 12, iOS 13). Where a developer wishes to test the application on a mobile device with particular parameters (e.g., a 2013 iPhone 5 running iOS 7.4) and there is no physical mobile device in the remote testing lab 611 with those parameters, one or more copies of a virtual mobile device with those parameters can be instantiated on a virtual machine such that the application can be tested on that particular device. In this way, the remote testing lab 611 can provide testing for applications on nearly any mobile device with smartphone capabilities with any set of brand, hardware, and operating system configurations desired. Further, the application can be tested on multiple instances of the same device for consistency (e.g., to evaluate or identify rarely occurring errors) or across different versions of the same device (e.g., to identify incompatibilities with certain production versions of hardware or with certain versions of the same operating system).

Test results are stored in the cloud-based storage 607, and are further sent to the data transformation module 610 to serialize that transform the test result data for incorporation as additional training data into the machine learning algorithm(s) 605. The machine learning algorithms 605 can incorporate the results of the testing into their analyses of the application, testing scenarios, and actual customer usage data to generate more accurate and reliable testing scenarios.

FIGS. 7A-B is an example mobile application screens produced within testing mobile devices as part of the function of the intelligent mobile application testing system according to one aspect. When a mobile application is tested on different mobile devices, the applications may utilize user interface elements that are provided by an operating system upon which the application is running. Depending upon the particular elements, displays of similar data onto screens of the various mobile devices may rending this information in many different ways. When a mobile application is developed to operating on multiple devices/operating systems, the mobile application, and its corresponding testing, must take into account how the same data is rendered by each operating system.

FIG. 7A illustrates a similar screen 701 rendered by the mobile application under a second operating system, for example, Android, developed by GOOGLE, Inc.™ In contrast, FIG. 7B illustrates an example application screen 702 rendering using a second operating system, for example, iOS on an iPhone developed by APPLE, Inc.™ Each of these application screens many be generated by the same application in that it is displaying the same information to provided similar functionality. The test system 150 must take into account how this same data is presented to a user on these systems.

Test system 150 uses virtual machines and test devices that uses the appropriate user interface elements. By testing the mobile application using the same live data, the rendering of the data many be verified to correctly display the data in a useable way in spite of these user interface differences. Testing that mobile applications are designed to accurately render useful displays is important to create better mobile applications. Testing of these user interface elements require to use live data that users will experience to ensure the screens 701-702 are designed properly.

FIG. 8 is an example screen relationship graph for a mobile application produced as part of the function of the intelligent mobile application testing system according to one aspect. One aspect of the present invention is automated generation of test sequences to be applied to the mobile application 142. As discussed above in reference to FIG. 4, the mobile application contains a plurality of user interface (UI) screens 801, 802, 803, 804, 805, 806, 807, 808, 809, 810, each of which is activated from occurrence of an event using a UI control item on one of the screens which causes the mobile application to render a second screen. The choice of which screen is to be rendered in response to a particular event, such as a user click onto a UI control item, is based upon other data present on the screen or based upon other status parameter values within the mobile application.

In FIG. 8, screen 7 807 shows three UI screen display paths, a first of which is a path 871 from screen 7 707 to screen 8 708, and a second of which is a path 872 from screen 7 707 to screen 10 710. In this example, when a first event occurs when screen 7 707, the mobile application 142 determines that screen 8 708 is to be rendered next. Similarly, when a second event occurs when screen 7 707, the mobile application 142 determines that screen 10 710 is to be rendered next. The mobile application 142 once at screen 10 810, may follow path 873 to screen 9 809 upon an occurrence of a subsequent event once the mobile application 142 has renders screen 10 810.

By activating every UI control on every screen and recording the screen changes, an application screen relationship graph may be generated containing all possible paths between screens in the mobile application 142. This screen relationship graph is useful in designing test scenarios for testing mobile application 142. An initial screen relationship graph may be automatically generated by the test system as it analyzes each UI screen, identifies all of the control elements found, and records the path to the next UI screen when each control element is activated. The test system may automatically walk through all of the screen paths to generate a screen relationship graph similar to that shown in FIG. 8. One type of error condition may be identified from screen relationship graph where a screen path 821 may cause mobile application 142 to transition from screen 2 802 to screen 1 801 but does not identify a return path to screen 2 802 or any other screen. As such, mobile application 142 that reaches screen 1 801 stops any further possible operation. Users may determine if such a determination of the operation of mobile application 142 should be stopped or if a required screen path from screen 1 801 to a different screen is missing from the mobile application 142. Similarly, test screens in which no screen path may be found also represents a test condition to be identified by test system 150 and its automated transversal of the screens.

Many applications may generate complex screen relationship graphs which have a large number of possible screen paths depending on a large number of possible conditions present at runtime. Because the number of paths that may exist may present a problem testing each control/condition combination in a reasonable amount of time, test system 150 uses a plurality of mechanisms to identify higher priority paths and their corresponding control/condition combination that are useful in testing the mobile application 142 in use by users. These mechanisms include retaining historical test sequences from prior testing sessions for the application which may represent areas of interest and focus by developers. These mechanisms may also use AI techniques to predict possible areas of potential problems based upon UI elements found on the screens, based upon the changes made since prior testing may have occurred, and based upon new types of test data to be presented to the mobile application 142. Each of these mechanisms may be used to identify a priority hierarchy for testing sequences that are to be tested.

For example, test system 150 may have detected from prior testing that many of these paths are based upon similar conditions and errors which may arise affect these paths all in the same way. In this situation, test system 150 may expect that testing a few of these similar paths will result in a similar pass or fail determination, and as such may recommend testing a few representative paths and conclude that success on the few tested will not provide additional testing data if all of the possible paths are exercised.

Similarly, test system 150 may have past experience in testing similar applications when the type of data being used changes from test sequence to the next. For example, mobile applications 142 that utilize references to measurements and currency may expect that certain types of errors may arise when measurements are changed from inches to centimeters, or when currency denominations change for US dollars to Euros. Test system 150 may detect that such a change in data being processed within the mobile application 142 and then recommend only screen/condition combinations that utilize this change in data be given a higher priority in testing. Other types of past testing experience with both earlier versions of the mobile application 142 in test, and earlier mobile applications tested that utilize similar functionality, may predict areas of testing in which errors have been found in the past that may also be given higher priority in new testing. All of the determinations of potential test scenarios of these types may be generated by test system 150 without developer input or interaction.

Test system 150 also may permit a developer to define and exercise test scenarios from client development system 140*a* that interacts with test system 150. In these situations, a developer may interactively define control element/condition combinations to be tested by instructing test system 150 to cause mobile application 142 being tested to exercise one or more combinations and immediately display the results to the user at client development system 140*a*. Mobile application 142 may be loaded into a mobile test device 157*a* or into mobile device virtual machine 155*a* which performs the execution of the application. Test system 150 may record all of these interactively submitted test sequence commands as a user generates and executes them. Areas of testing that are more frequently tested by users in this fashion provides test system 150 additional data to identify higher priority screen paths and their corresponding UI control element/condition combination. Test system 150 may use these identified paths to provide recommended test sequences to users when mobile application 142 is uploaded for testing.

FIGS. 9A-B are an example mobile application usability screens produced as part of the function of the intelligent mobile application testing system according to one aspect. Test system 150 also performs analysis on content of UI screens to determine if the content is rendered in a useful manner based upon the content being displayed. This analysis focuses on the visual presentation of the screen image and the manner in which the UI elements and associated data is rendered for a user.

FIG. 9A illustrates an example of a mobile application display for an ecommerce application 901 that contains multiple UI elements 911-913. A set of these elements 911 may be located on a menu bar, a set of these elements 912 may located on a control dock, and multiple items containing merchandise 912*a*-912*b* may be in the body of the screen. Additional elements 913 may be located at other locations on the screen. Test system 150 identifies these elements and may indicate their location visually. In this embodiment, a dashed box may be shown around the elements.

Once the size and location of each element is determined, a number of tests may be made against each of these elements. For example, each UI element may be checked to see if it overlays with other elements on the screen and if a predetermined amount of space (measured in pixels or similar measurements) exists between each element. These elements may be checked to ensure that each one is between a minimum and maximum preferred element size. All of these tests utilize specific specification for a particular mobile device such that differences in rendering may be tested on devices having larger and smaller screen sizes.

Test system 150 may present a visual display of these elements as shown in FIG. 9A to permit a user testing the mobile application 142 to view the screens and these elements. The test system may also indicate which, if any, of these elements exceed set design parameters. The UI elements having size and/or location values exceeding the design parameters may be displayed differently that other elements having acceptable values. For example, UI elements having design parameters exceeding the design parameters may be indicated by a red box that has thicker lines and blinks rather than a solid blue one. Such visual indicators identify potential problems to the user during testing.

Additionally, test system 150 may access data to be displayed from a live ecommerce site, or a live test site, to provide dynamically generated display screens which may vary based upon the content of the data being accessed rather than a static set of test data. As such, UI elements that change appearance based upon the content being displayed will be dynamically tested under a larger set of possibilities that approximate actual use of the mobile application by end users. Such testing may proceed with a varied set of test scenarios that uses different types of data ensuring more complete test coverage. Users may view these test results on a client development system 140a and make changes to the mobile application 142 as needed.

FIG. 9B illustrates an example display screen 902 in which several UI elements are shown to possess potential display issues. UI element 921 in the menu bar is shown to contain a text string, such as a search value, in which the entire text string cannot be displayed because the number of characters cannot be rendered in the available space using a selected font size. As such, this UI element 921 may represent a potential design problem for the screen 902. Because this testing is performed using live and dynamic data, such design problems may be identified event when an issue appears when a small subset of possible data values are used. The frequency of the appearance of this warning may be useful to determine whether the UI element needs alteration.

A second UI element 922 is used to present a graphical icon corresponding to an item for sale by the ecommerce site. Visual testing of the icon may be performed to identify potential design issues related to its display. Many such icons for items may be created using an image, whether photographic or graphic, that represents the item for sale. In such cases, potential display issues may arise when color of various visual components of the icon are placed into the particular display screen. For example, the color of the icon, the color of any text within the icon, and the color of the background of the display screen may be tested to ensure that items layered on top of each other are visually discernable from each other. For example, light colored, or white text, placed on top of a light colored icon, white on light pink, may be difficult to read on mobile devices having a smaller number of displayable colors. An identical arrangement of text and graphic items may appear easily readable with white letters are placed upon a bright red icon. This visual comparison of color, intensity, and contrast may be applied to text and icons within UI elements as well as UI elements and screen background to determine if potential issues exist anywhere on the display screen.

UI element 923 containing a textual description of an item for sale by the ecommerce site may also be tested separate from its corresponding icon. This text 923 may be tested to see if all of the characters of the description can be displayed in the available space as well as comparing the color of the text to the background of the display screen. All UI elements that are found to have potential display problems may be marked with an identifying box (with a red border) and with its contents covered with a graphical indication, such as a different background color or opacity. All such indications may be viewed by a user of the test system 150 to determine if UI elements need alternation.

FIG. 10 is an example processing architecture for and exemplary embodiment the intelligent mobile application testing system according to one aspect. Test system 1050 is coupled to client development system 1040 to permit testing of mobile application 142 (not shown). Mobile application 142 is exercised in either a mobile test device 1057 or a mobile device virtual machine 1055a-n under the control of test controller 1056.

Test system 1050 comprises test controller 1051, screen analyzer 1052, screen path analyzer 1053, network data analyzer 1041, app loader test interface 1042, target device modeler 1043 and its corresponding mobile device model data store 1045, and test device interface 1044. Screen analyzer 1052 comprises object sizer 1021, text sizer 1022, and color analyzer 1023 and performs all of the visually related testing to display screens as discussed above in reference to FIG. 9A-B. Object sizer 1021, determines UI elements size and location when rendered onto a particular mobile device screen in mobile test device 1057 or a mobile device virtual machine 1055a. This location and size data is then used to determine if any of the UI elements present potential display problems to be marked for user interpretation and modification. Text sizer 1022 determines the size of all text strings to be displayed within each UI element based upon the particular mobile device, the font used and the size and location of the text is its corresponding UI element. This size data permits a determination of whether, and if so how much, of the text string fits within allowable space for the UI element. Color analyzer 1023 uses the location of UI elements, their respective content, and color definitions for each of these items to determine which, if any of adjacent items present a potential display issue when comparing the icons, text, background, and images that make up the display screen when rendered onto a particular mobile device using specific color rendering characteristics. Intensity, contrast, and color hue may be some of the factors that are used to identify when overlapping and adjacent items may possess potential problems.

Screen path analyzer 1053 comprises app screen traverser 1031 and its test sequence data store 1035, runtime data logger 1032, and runtime test sequencer 1033 to perform the display screen paths by generating a screen relationship graph for the mobile application 142 as discussed above in reference to FIG. 8. App screen traverser 1031 and its test sequence data store 1035, are used to generate the screen relationship graph for the mobile application by examining all of the UI elements and controls within each display screen in the mobile application 142 and all screen paths associated with the controls. App screen traverser 1031 also generates any recommended test sequences to be used in testing mobile application 142 as well as priority determination as to which test sequences are recommended to be useful. App screen traverser 1031 also detects potential screen displays having no return paths once the application arrives at the particular screen as well as any display screens that may not be reached by from any other display screen.

Runtime data logger 1032, interacts with a mobile test device 1057 or a mobile device virtual machine 1055a while interactive test sequences are generated and exercised under control of users of the client development system 1040 communicating with the test controller 1051. The used test sequences (including all runtime data used in the test sequence) and their corresponding results are logged into the data store 1035 for later use in determining priority of different test sequences recommended by test system 1050 when analyzing mobile application 142. Runtime test sequencer 1033 processes any recommended test sequences recommended by prior testing as well as user commands as discussed above in reference FIGS. 8 and 9A-B. The test sequences are submitted to the mobile application 142 that is being exercised in mobile test device 1057 or mobile device virtual machine 1055a, causing the sequence to be tested. Runtime test sequencer 1033 also retrieves any results from each step in the test sequences for communication to users of client develop system 1040 and storage into data store 1035 for later use. Test sequences processed by runtime test sequencer 1033 may be performed automatically under the control of text controller 1051 or interactively based upon commands from the client development system 1040.

Network data analyzer 1041 performs estimated processing time calculations for each display screen as it is tested within each test sequence. When a test sequence causes mobile application 142 to render a new display screen, the amount of data retrieved by the mobile application from external data sources such as web servers may be measured. Using this data measurement, network data analyzer 1041 may generate estimates for the amount of time the mobile application 142 will require to completely render the particular display screen on the particular mobile device. Network characteristics, such as network loads and network transfer rates (as defined by the protocols supported by the mobile device under test), may be used with the data measured to estimate the time needed to first download and then render the display screen. Such analysis may permit mobile application 142 to be tailored to work acceptably under differing network situations.

App loader test interface 1042 provides an interface between client development system 1040 and test controller 1051. Mobile application 142 may be uploaded using this interface to request test controller 1051 to select a test mobile device 1057 or mobile device virtual machine 1055*a* for use in testing and then cause the application to be transferred to the test machine. App loader test interface 1042 also provides an interface to accept test sequences and interactive test commands when users are performing testing. Test results from the test sequences and the individual sequence steps may be returned to client development system 1040 through this interface 1042.

Target device modeler 1043 and its corresponding mobile device model data store 1045, are used to assist the test modules within test system 1050 adjust a particular test operation to correspond to the particular mobile device upon which mobile application 142 is being tested. For example, screen size, color range, available memory and the like are device specifications that alter test results of how UI elements are rendered and interpreted. These characteristics may be used by the test modules when generating and evaluating particular test results.

Test device interface 1044 provides an interface between test modules within test system 1050 to test mobile device 1057 or mobile device virtual machine 1055*a* when loading mobile application 142, particular test sequence commands, and retrieving test sequence step results when testing occurs. Each different mobile test device 1057, or supported operating system, may require differing communication methods to perform these data transfer tasks. Similarly, interacting with a virtual machine 1055*a*, whether co-located on the same computing system or remotely located on a cloud based server, to perform these testing data transfer operations may require different processing and communication protocols depending upon the virtual machine provided by test device interface 1044.

FIG. 11 is an example flowchart of operations implementing an exemplary mobile device testing according to one aspect. The processing begins and in step 1101 a mobile application is received for testing from an external client development system. The mobile application is loaded onto a test mobile device in step 1102. Automated testing begins in step 1103 exercising each of a plurality of user interface elements on each of a plurality of display screens presented by the mobile application to predictively analyze correct behavior of that element while simulating human interaction with those elements. The results of the exercising of each user interface element are used by step 1104 to generate a screen relationship graph containing a relationship representation of a plurality of screens presented by the mobile application.

Step 1105 generates a recommended test sequence of any user interface elements tested from predictively expected behavior for that element and step 1106 generates a priority value for each recommended test sequence from predictively expected behavior for that element. Using the recommended test sequence. Step 1107 exercises the mobile application using a recommended test sequence. Test results associated with the recommended test sequence is received in step 1108; the test results are associated with visual display of the user interface elements on each display screen;

Step 1109 communicates the test results with external client development system and the test results are stored into a screen path analyzer data store for later use in generating test sequences and test sequence priority values in step 1110 before the method ends.

FIG. 12 is a diagram showing exemplary relationships between actors 1210, levels of automation 1220, and processes for automated generation and implementing of software testing 1230 based on an automated analysis of the software. The levels of automation 1220 of software testing range from fully manual testing 1221 to fully automated testing (intelligent automation) 1223, which partially-automation (automated execution) 1222 as an intermediate stage between the two.

At the manual testing level 1221, the actors 1210 are all humans. Humans both create the testing scenarios 1211 and execute the testing scenarios 1212 in order to test the software. This requires that a person map the software (in the case of mobile apps, usually on a screen-by-screen basis), identify dynamic or operable objects in the software (e.g., data entry fields, clickable buttons or links, etc.), and identify the operational flow of the software (e.g., clicking on the "login" button on the home screen takes one to the login page, etc.). One that process has been done, a person manually operates the software to operate every dynamic object on every screen to ensure that the actual operation of the software matches the expected operation of the software.

In terms of automation of software testing, processes 1230 that occur at the manual level primarily involve model creation 1240 comprising understanding and organizing data 1241 and training machine learning algorithms 1243 using the organized data 1241 to generate models 1242 which can be used to automatically analyze software applications without human involvement (or with minimal human involvement such as verification of the model's output).

The intermediate stage in automation of software testing is automated execution 1222, in which the actors 1210 are a combination of humans and automated tools. Humans create the testing scenarios 1213, but the testing scenarios are then executed by automated tools 1214 such as software bots that can automatically operate the software to operate every dynamic object on every screen to ensure that the actual operation of the software matches the expected operation of the software. The automated tools 1214 do this by generating commands to the software under test that simulate clicks, entry of data, etc. In this intermediate stage of automated execution 1222, the automated tools are told by humans via code, testing scripts, etc. which operations to perform on which screens, etc. Automated execution 1222 accelerates the testing process substantially as testing can be performed many times faster than manual testing, and the same testing scenario can be loaded and repeated as necessary (e.g., to test a new version of software without having to re-create the testing scenario).

In terms of automation of software testing, processes 1230 that occur at the automated execution level 1222 involve automated execution 1250 of testing scenarios. The automated testing tools can apply automated test execution 1250 regardless of whether the testing scenarios are created by humans 1211, 1213 or intelligent automation 1215 tools because the code, testing scripts, etc. received by the automated testing tools will be of a similar nature (e.g., some form of formatted instructions to the effect that a certain object should be operated and the expected outcome of operation of the object is to be taken to the next page).

The last stage in automation of software testing is intelligent automation 1223 in which the actors 1210 are all automated tools. Models developed from machine learning algorithms create the testing scenarios from automated analyses of the software 1215 and execute the testing scenarios using automated tools 1216 such as software bots. In this stage, models and model parameters that were created at the model creation stage 1240 are used to automatically generate testing scenarios 1260 from automated analysis of the software using the models. The automated test scenario generation process comprises analyzing the software automatically using the same process as for manual analysis, to wit, mapping the software (in the case of mobile apps, usually on a screen-by-screen basis) 1261, identifying dynamic or operable objects in the software (e.g., data entry fields, clickable buttons or links, etc.) 1262, and identifying the operational flow of the software (e.g., clicking on the "login" button on the home screen takes one to the login page, etc.) 1263. A final step is to add validation test selections 1264, which may either be done manually by receiving a list of validation tests to perform, or automatically by comparing the software with similar examples of software using a machine learning model and selecting a similar battery of validation tests.

As software is analyzed, testing scenarios are generated, and test results are obtained, the test results may be forwarded to humans for verification as the manual testing level 1221 for manual improvement of model creation 1240 or back to the model creation stage 1240 directly for incorporation into additional training data 1243 for automated improvement and updating of the generated models 1242.

FIG. 13 is a diagram showing the relationships between different types of machine learning algorithms, the models that can be developed from them, and the use cases to which they may be applied in software testing. Machine learning algorithms 1310 can be categorized into three primary types: unsupervised learning algorithms 1311, supervised learning algorithms 1312, and reinforced learning algorithms 1313. Each type of machine learning algorithm results in a particular type of model 1320 which is useful for certain applications in software testing 1330.

Unsupervised learning 1311 produces clustering or density-based models 1321 that can be used to identify, describe, or extract relationships between things based on their closeness or similarity to other things in terms of clustering or grouping characteristics. Training an unsupervised machine learning algorithm on a large number of applications will result in common patterns of clustering and grouping. Depending on the parameters of the machine learning algorithm, clustering may be unrelated to the textual or visual content of the screens. For example, the machine learning algorithm may be configured in such a way that it analyzes connections to other screens or relationships of objects on a screen, and not the semantic similarity of the textual content or similarity of image content. When an unknown software application is then processed through the trained machine learning algorithm, application can be mapped by predicting functionality or other characteristics of each screen based on where it falls within the common patterns of clustering and grouping. For example, an application screen falling in or near a cluster of screens with characteristics common to "home" screens can be predicted to be a home screen, with similar functionality, characteristics, and connections as the home screens in the cluster. This knowledge can be used to "map" the application by determining the number, type, functionality, and likely connections of the screens in a software application being analyzed. Further, the "type" of software application may be predicted based on its clustering relative to the training data. If, for example, unsupervised learning is performed separately on different types of applications, the clustering characteristics of each type of application can be used to predict whether an application falls within that type (e.g., travel planning applications will have a clustering similarities with other travel planning applications, gaming applications will have clustering similarities with other gaming applications, etc.).

Supervised learning algorithms 1312 are used to produce models that classify things based on pre-labeled training data sets 1322. For example, a supervised machine learning algorithm may be trained on data sets comprising many screens of software applications in which each dynamic or operable object on the screen is labeled with labels such as "button," "radio button," "toggle switch," "data field," etc. When the machine learning algorithm has been trained with a sufficient number of screens with such labels, it will result in a model which can reliably identify such objects and predict their functionality. For example, the model will recognize that rectangular objects of a different color than the background with the word "Login" in them will likely be login buttons that will present a user name and password for authentication. Supervised learning models 1312 are useful for identifying objects, images, and areas of the screen that are dynamic objects (i.e., objects with which a user can interact such as buttons, data fields, toggle switches, etc.) 1332.

Reinforced learning 1313 is a trial and error methodology in which models are developed by exploring available options and choosing those with certain characteristics 1323. As a simple example, an artificial "mouse" may learn a path through an artificial "maze" by taking steps in random directions and receiving a positive reward for those steps that result in a shorter path to the exit and receiving negative rewards for those steps that result in a location at a dead end. Similarly, a reinforcement learning algorithm can be trained by operating objects in a large number of applications to determine a probability of certain actions occurring from operation of a given type of object. From those probabilities, an application can be explored without code or testing scripts 1333. For example, the reinforcement learning model may learn through training data that for certain types of applications pushing a "help" button is most likely result in transfer to a static help page, but for other types of applications, pushing a "help" button is most likely to result in opening a chat window. This information may be used to predict the operational flow of an application from its application mapping 1331 and object identification information by predicting an action for each object on each screen of an application and assigning a probability as to the correctness of the prediction. If the actual result of operating the object results in an action different from the predicted action, a possible application error can be noted. As one example, the reinforcement learning model may be trained in such a way that it is rewarded for actions that result in moving to a new screen that is consistent with both the function of the identified object and the application mapping. Thus, during training, if an object is identified as a "help" button and clicking on the object consistently results in transfer to a screen mapped as a "help" screen, the reinforcement learning algorithm will learn to associate "help" buttons with "help" screens, and will be able to accurately predict the function of a "help" button in a software application being analyzed. If, during execution of a testing scenario, the "help" button does not result in a transfer to a "help" screen, this counter-predictive result can be flagged as a possible application error.

FIG. 14 is a diagram showing the use of machine learning algorithms to analyze a software application for generation of testing scenarios. In a first step, application mapping 1410 is performed by a trained machine learning model to identify screens of an application that have similarities to screens of applications in the trained model. As an example, if an application A has a home screen 1411 that falls within the cluster of screens representing home screens 1415 in the model, has a login screen 1412 that falls within the cluster of screens representing login screens 1416 in the model, and has a set of product screens 1413a-n that fall within the cluster of screens representing product screens 1417a-n in the model, the screens of the application can be mapped according to the same relationship structure as those in the model.

In a second step, object identification 1420 is performed by a trained machine learning algorithm to identify the type and number of objects on each screen. In this example, a home screen 1411 is shown with a login button 1421 identified on it, and a login screen is shown 1412 with a username data entry field 1422, a password data entry field 1423, and a login button 1424 on it.

In a third step, application exploration 1430 is performed by a trained machine learning algorithm to predict the operational flow of the application based on the application mapping 1410 and object identification 1420. In this example, the identified login button 1421 on the home screen 1411 is predicted, based on the trained model, to take the user to the login screen 1431 comprising the username data entry field 1422, a password data entry field 1423, and a login button 1424. Operation of the login button 1424 is predicted, based on the model, to return the user 1432 to the home page 1411 for further action.

In an alternate embodiment, the application mapping 1410, object identification 1420, and application exploration 1430 may be performed iteratively, rather than sequentially. For example, for each screen of the application, the objects on that screen may be identified and a functionality may be predicted based on a machine learning model. Each object may then be operated to determine its actual function, and the actual function may be compared with the predicted function to identify anomalies. Further, the actual and/or predicted functionality of each object on each screen may be combined into a functional map of the application, which may then be used for further testing (e.g., color contrast, readability, performance, etc.).

FIG. 15 is a diagram showing the overall process for using machine learning algorithms to automatically develop and implement testing scenarios based on an automated analysis of software. Training data 1510 is fed to one or more machine learning algorithms 1501 to develop models 1520 as more fully described in the description of FIG. 13. When a software application is received for testing 1502, it is analyzed using the machine learning models 1520, which may perform one or more of the steps of mapping application screens 1521, identifying objects on the screens 1522, and exploring the application to identify its operational flow 1523, as more fully described in the description of FIG. 13. Based on the software analysis, validation tests may be selected 1524 a non-limiting list of which includes visual quality, color contrast, word cutoffs, reliability, performance, security, font size issues, incorrect links and/or transfers, invalid responses, crashes, etc. In other embodiments, a list of validation tests may be received that is not based on the software analysis (e.g., a standard battery of tests) and may be applied to the analyzed software application.

After the software is analyzed using models 1520, the validation tests 1524 may be automatically executed on the software 1530 by receiving a list of mobile devices on which the software application should be tested 1531, automatically installing the application on devices in a testing lab 1532, and performing testing in accordance with the testing scenario(s) 1533 generated at the analysis stage 1520 based on the analysis of the software 1521-1523 and validation tests selected 1524.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Referring now to FIG. A, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. A illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some aspects, systems may be implemented on a standalone computing system. Referring now to FIG. B, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. A). Examples of storage devices 26 include flash memory, magnetic hard drive, CD-ROM, and/or the like.

In some aspects, systems may be implemented on a distributed computing network, such as one having any number of clients and/or servers. Referring now to FIG. C, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. B. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CAS SANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system or approach is specifically required by the description of any specific aspect.

FIG. D shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated software testing, comprising:
    a computing device comprising a memory and a processor;
    a first machine learning algorithm operating on the computing device, the first machine learning algorithm configured to classify one or more screens of a software application;
    a second machine learning algorithm operating on the computing device, the second machine learning algorithm configured to predict an operational flow of the software application based on the classification of the screens from the first machine learning algorithm and identification of operable objects on the screens from an automated test scenario generator; and
    the automated test scenario generator comprising a first plurality of programming instructions stored in the memory which, when operating on the processor, cause the computing device to:
        select or receive one or more validation tests for the software application; and
        identify one or more operable objects on the one or more screens of the software application;

generate a testing scenario for the software application, the testing scenario comprising a test script for application of the validation tests to the software application based on the classified screens, the identified operable objects, and the predicted operational flow.

2. The system of claim 1, wherein the first machine learning algorithm is an unsupervised learning algorithm.

3. The system of claim 1, wherein the second machine learning algorithm is a reinforced learning algorithm.

4. The system of claim 1, further comprising an automated execution module comprising a second plurality of programming instructions stored in the memory which, when operating on the processor, causes the computing device to test the software application by executing the testing scenario on an installed copy of the software application.

5. The system of claim 4, further comprising a virtual machine operating on the computing device and wherein the software application is installed and tested on a virtual second computing device operating on the virtual machine.

6. The system of claim 4, further comprising a second computing device and wherein the software application is installed and tested on the second computing device.

7. A method for automated software testing, comprising the steps of:
    using a first machine learning algorithm operating on a computing device to classify one or more screens of a software application;
    using a second machine learning algorithm operating on the computing device to predict an operational flow of the software application based on the classification of the screens from the first machine learning algorithm and identification of operable objects on the screens from an automated test scenario generator operating on the computing device; and
    using the automated test scenario generator to:
        select or receive one or more validation tests for the software application; and
        identify one or more operable objects on the one or more screens of the software application;
        generate a testing scenario for the software application, the testing scenario comprising a test script for application of the validation tests to the software application based on the classified screens, the identified operable objects, and the predicted operational flow.

8. The method of claim 7, wherein the first machine learning algorithm is an unsupervised learning algorithm.

9. The method of claim 7, wherein the second machine learning algorithm is a reinforced learning algorithm.

10. The method of claim 7, further comprising the step of using an automated execution module operating on the computing device to test the software application by executing the testing scenario on an installed copy of the software application.

11. The method of claim 10, further comprising the steps of installing the software application on a virtual second computing device operating on a virtual machine operating on the computing device and testing the software application on the virtual second computing device.

12. The method of claim 10, further comprising the steps of installing the software application on a second computing device and testing the software application on the second computing device.

* * * * *